United States Patent
Dou et al.

(10) Patent No.: US 9,143,240 B2
(45) Date of Patent: Sep. 22, 2015

(54) NONLINEAR COMPENSATING APPARATUS AND METHOD AND TRANSMITTER

(71) Applicant: FUJITSU LIMITED, Kawasaki-shi, Kanagawa (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 387 days.

(21) Appl. No.: 13/771,822

(22) Filed: Feb. 20, 2013

(65) Prior Publication Data

US 2013/0216238 A1    Aug. 22, 2013

(30) Foreign Application Priority Data

Feb. 20, 2012  (CN) .......................... 2012 1 0039262

(51) Int. Cl.

| H04B 10/04 | (2006.01) |
|---|---|
| H04B 10/00 | (2013.01) |
| H04B 10/12 | (2006.01) |
| H04B 10/58 | (2013.01) |
| H04L 25/03 | (2006.01) |
| H04B 10/2543 | (2013.01) |

(52) U.S. Cl.
CPC ............ *H04B 10/58* (2013.01); *H04B 10/2543* (2013.01); *H04L 25/03343* (2013.01)

(58) Field of Classification Search
None
See application file for complete search history.

(56) References Cited

U.S. PATENT DOCUMENTS

| 8,774,313 | B2* | 7/2014 | Dou et al. ...................... 375/296 |
|---|---|---|---|
| 2006/0051039 | A1* | 3/2006 | Wei ............................... 385/123 |
| 2007/0036238 | A1* | 2/2007 | Matero et al. ................ 375/296 |
| 2009/0225899 | A1* | 9/2009 | Dent ............................. 375/296 |
| 2013/0077979 | A1* | 3/2013 | Dou et al. ...................... 398/192 |
| 2013/0188948 | A1* | 7/2013 | Dou et al. ...................... 398/28 |

OTHER PUBLICATIONS

Weeks, Michael, Digital Signal Processing: Using Matbab & Wavelents, 2011, Jones and Bartlett Publishers, LLC, 2nd Ed., p. 170.*
Grinker et al., Mathematics, 2009, Pearson Education South Africa (Pty) Ltd., p. 6.*
Dou et al., A Low Complexity Pre-Distortion Method for Intra-channel Nonlinearity, 2011, OSA.*
Mecozzi et al., "Analysis of Intrachannel Nonlinear Effects in Highly Dispersed Optical Pulse Transmission", IEEE Photonics Technology Letters, vol. 12, No. 4, Apr. 2000, pp. 392-394.
Dou et al., "A Low Complexity Pre-Distortion Method for Intra-channel Nonlinearity", OSA/OFC/NFOEC, 2011, 3pp.

* cited by examiner

*Primary Examiner* — Ken Vanderpuye
*Assistant Examiner* — Jai Lee
(74) *Attorney, Agent, or Firm* — Staas & Halsey LLP

(57) ABSTRACT

The present invention provides a nonlinear compensating apparatus and method and a transmitter. The nonlinear compensating apparatus includes: an information sequence acquiring unit, configured to acquire a symbol information sequence of the pulse signal; a perturbation quantity acquiring unit, configured to calculate, by pre-obtained weighting coefficients to which each item corresponds, the weighted sum of interaction items of pulses on one or more moments relative to the current moment; a perturbation quantity processing unit, configured to combine the items of the perturbation quantity based on the weighting coefficients; and an information compensating unit, configured to calculate a difference between the symbol information sequence and the processed perturbation quantity to obtain a compensated symbol information sequence. With the embodiments of the present invention, the complexity of calculation may be further lowered, and requirements on hardware may also be lowered.

15 Claims, 4 Drawing Sheets

NONLINEAR COMPENSATING APPARATUS AND METHOD AND TRANSMITTER

CROSS-REFERENCE TO RELATED APPLICATION

This application is based upon and claims the benefit of priority of the prior Chinese Patent Application No. 201210039262.X, filed on Feb. 20, 2012, the entire contents of which are incorporated herein by reference.

TECHNICAL FIELD

The present invention relates to the field of optical communication, and in particular to an intra-channel nonlinear compensating apparatus and method and a transmitter.

BACKGROUND ART

The intra-channel nonlinearity is inherent damage in an optical transmission system and is originated from the Kerr effect of an optical fiber. When the rate of the single channel reaches 40-60 Gbits/s or more, the pulses within the same channel will be greatly widened and overlapped each other due to the effect of dispersion, and with the effect of the nonlinearity, energy exchange will occur between the overlapped pulses. In such case, even though the residual dispersion in the link was compensated for at the receiving side, the system would still be severely nonlinearly damaged. The effect of nonlinearity within the channel on the system includes: timing jitter, signal amplitude fluctuation, and generation of ghost pulse.

In recent years, as the increase of the capacities of optical transmission systems, more complex multidimensional modulation technologies, instead of simple intensity modulation formats, have been a hot spot in studies. For ensuring that a complex modulation has a sufficient signal to noise ratio, it is needed that a link system has higher input power, and this undoubtedly results in the increase of cost of nonlinearity in the system.

For a long-haul optical communication system, how to compensate for or mitigate the cost of nonlinearity within a channel is an important issue for study. Studies have been done with respect to design of link, DSP processing of receiver and coding of transmitting signal. A method for mitigating nonlinearity by subtracting nonlinear perturbation at a transmitter side has been proposed in the prior art. Such a method is based on double oversampling, wherein a perturbation item is equal to a weighted sum of products of a series of three items (symbol information data of three moments), and the weighted value is decided by the dispersion, gain/attenuation and nonlinear coefficient of the link. The advantage of the method exists in the reduction of complexity, and especially in a PSK system, a pre-compensated waveform may completely be realized by means of addition and subtraction.

However, in the implementation of the present invention, the inventors found that the disadvantages of the prior art exist in: in a phase modulation system, the complexity of hardware in an existing compensating method is mainly dependent on the complexity of the complex additions and the number of the complex additions; and when the residual dispersion of the link is relatively large, in order to obtain a better effect of compensation, the number of the pulse interactive items is also relatively large, which puts forward a relatively high requirement on the hardware.

Following documentations are listed for better understanding of the present invention and the prior art, which are incorporated herein by reference, as they are fully stated herein.

[Reference 1]: IEEE PTL Vol. 12, No. 4, 2000, Antonio Mecozzi et. al.

[Reference 2]: L. Dou, Z. Tao, L. Li, W. Yan, T. Tanimura, T. Hoshida, and J. C. Rasmussen, "A low complexity pre-distortion method for intra-channel nonlinearity," in *Proc. OFC/NFOEC*2011 *Conf.*, Los Angeles, U.S.A., March. 2011, paper OThF5.

SUMMARY OF THE INVENTION

The embodiments of the present invention provide a nonlinear compensating apparatus and method and a transmitter, with an object of combining pulse interactive items according to properties of weighting coefficients, so as to further lower the complexity of calculation and lower the requirements on the hardware.

According to an aspect of the embodiments of the present invention, there is provided a nonlinear compensating apparatus, includes:

an information sequence acquiring unit, configured to acquire a symbol information sequence of the pulse signal inputted by a transmitting side;

a perturbation quantity acquiring unit, configured to calculate, by pre-obtained weighting coefficients to which each item corresponds, the weighted sum of interaction items of pulses on one or more moments relative to the current moment, so as to obtain the perturbation quantity produced on a transmission link with a certain length;

a perturbation quantity processing unit, configured to combine the items of the perturbation quantity based on the weighting coefficients, so as to transform complex addition into a combination of addition and multiplication of symbols in a finite symbol set; and an information compensating unit, configured to calculate a difference between the symbol information sequence and the processed perturbation quantity to obtain a compensated symbol information sequence, so as to cause the transmitting side to transmit signals according to the compensated symbol information sequence.

According to another aspect of the embodiments of the present invention, there is provided a nonlinear compensating method, includes:

acquiring a symbol information sequence of the pulse signal inputted by a transmitting side;

calculating, by pre-obtained weighting coefficients to which each item corresponds, the weighted sum of interaction items of pulses on one or more moments relative to the current moment, so as to obtain the perturbation quantity produced on a transmission link with a certain length;

combining the items of the perturbation quantity based on the weighting coefficients, so as to transform complex addition into a combination of addition and multiplication of symbols in a finite symbol set; and calculating a difference between the symbol information sequence and the processed perturbation quantity to obtain a compensated symbol information sequence, so as to cause the transmitting side to transmit signals according to the compensated symbol information sequence.

According to still another aspect of the embodiments of the present invention, there is provided a transmitter, includes the nonlinear compensating apparatus as described above, and the transmitter further includes:

a pulse shaping unit, configured to pulses shape based on the compensated symbol information sequence obtained by the nonlinear compensating apparatus, to obtain the waveform of each pulse; and a signal transmitter, configured to receive the waveform of each pulse transmitted by the pulse shaping unit, then modulate and transmit the waveforms.

The advantages of the embodiments of the present invention exist in: the symbol information of the pulse signals inputted by a transmitting side may be compensated for, and if the apparatus is applied in a transmitter, the transmitter can shape and modulate the pulses by using the compensated symbol information, and then transmit the signals; and after these signals are subjected to the nonlinear effect of optical fiber transmission, ideal undamaged signals may be obtained at the receiver.

And by combining pulse interactive items according to properties of weighting coefficients, the complex addition may be transferred into a combination of addition and multiplication of the symbols in a finite symbol set, thereby further lowering the complexity of calculation and lowering the requirements on the hardware.

These and further aspects and features of the present invention will be apparent with reference to the following description and attached drawings. It is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF THE INVENTION

Various embodiments of the present invention are described as follows in reference to the drawings. These embodiments are illustrative only, and are not intended to limit the present invention. For the easy understanding of the principles and embodiments of the present invention by those skilled in the art, the embodiments of the present invention shall be described taking an optical communication system as an example. However, it should be noted that the embodiments of the present invention are applicable to all the communication systems in which there exists nonlinear loss.

Figure 1:
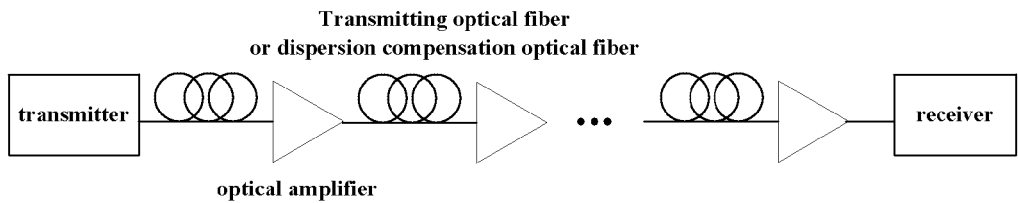
FIG. 1 is a schematic diagram of a typical optical communication system.

FIG. 1 is a schematic diagram of a typical optical communication system, in which the signal transmitted by a transmitter passes different devices (such as an optical fiber, an optical amplifier, and a dispersion compensation optical fiber, etc.) in a transmission link and reaches a receiver. In the embodiments of the present invention, the symbol information sequences of the inputted pulse signals are compensated for at the transmitting side by a nonlinear compensating apparatus, such that the transmitting side transmits specifically-deformed signals, and after these signals are subjected to the nonlinear effect of optical fiber transmission, ideal undamaged signals are obtained at the receiver.

In the system shown in FIG. 1, in order that inputted pulse signals can be compensated for at the transmitting side, the inventors first modeled intra-channel nonlinearity in the implementation of the present invention, and then compensated for the inputted pulse signals according to the nonlinear model.

In normal conditions, polarization multiplexing is often used at the transmitter side, so as to increase the spectrum efficiency to the greatest extent. Hence, a process of obtaining an intra-channel nonlinear model is described below taking dual polarization as an example.

First, for a vector signal, the transmission optical fiber may be modeled as a Manakov equation, as shown by formula (1) below:

$$\frac{\partial}{\partial z}u_H(t,z) + \frac{\alpha(z)}{2}u_H(t,z) + j\frac{\beta_2(z)}{2}\frac{\partial^2}{\partial t^2}u_H(t,z) = $$
$$j\gamma(z)[|u_H(t,z)|^2 + |u_V(t,z)|^2]u_H(t,z)$$
$$\frac{\partial}{\partial z}u_V(t,z) + \frac{\alpha(z)}{2}u_V(t,z) + j\frac{\beta_2(z)}{2}\frac{\partial^2}{\partial t^2}u_V(t,z) = $$
$$j\gamma(z)[|u_V(t,z)|^2 + |u_H(t,z)|^2]u_V(t,z) \quad (1)$$

where, $u_H(t,z)$ and $u_V(t,z)$ are electrical field components of the signal at the horizontal H and vertical V polarization states, respectively, and $\alpha(z)$, $\beta_2(z)$ and $\gamma(z)$ denote respectively distributions of attenuation coefficient, dispersion coefficient and nonlinearity coefficient in the optical link along the transmission distance.

Second, as the signals generated by the transmitter usually consist of optical pulses, the electrical field components at the transmitter side may be in the form expressed by formula (2) below:

$$u_H(t, z=0) = \sum_k A_k^H g(t-kT)$$
$$u_V(t, z=0) = \sum_k A_k^V g(t-kT) \quad (2)$$

where, $A_k^H$ and $A_k^V$ are information symbols of the k-th pulse at the horizontal H and vertical V polarization states, respectively, T is the pulse interval, and g(t) is the waveform of each of the pulses. It should be pointed out here that even though the output signals transmitted by the transmitter are of any waveforms, the output signals may still be deemed as being in the form expressed by formula (2), only if the time interval T is set sufficiently small.

Last, formula (1) is substituted by formula (2), in a case where the input power is not extremely great (that is, the nonlinearity of the optical link is not very intense), formula (1) may be solved by using the perturbation theory, and formula (3) is obtained:

$$u_H(t = kT, z = L) = u_H(t = kT, 0) + \qquad (3)$$

$$\sum_{m,n} \{[A^H_{m+k} A^H_{n+k} (A^H_{m+n+k})^* + A^H_{m+k} A^V_{n+k} (A^V_{m+n+k})^*] C(m, n, z = L)\}$$

$$u_V(t = kT, z = L) = u_V(t = kT, 0) +$$

$$\sum_{m,n} \{[A^V_{m+k} A^V_{n+k} (A^V_{m+n+k})^* + A^V_{m+k} A^H_{n+k} (A^H_{m+n+k})^*] C(m, n, z = L)\}$$

Where, in formula (3), the electrical field value at the k-th pulse sampling moment at the receiver side consists of the electrical field value and perturbation quantity of the k-th pulse at the transmitting side, and wherein, the perturbation quantity is a weighted sum of a plurality of interaction items, each item being a product of transmitting pulse information symbols on one or more moments. Where, in the process of solving formula (1) by using the perturbation theory, low-order items are taken and high-order items are neglected in calculation.

Hence, a weighted sum of interactions of the pulses at three moments, the (m+k)-th moment, the (n+k)-th moment and the (m+n+k)-th moment, relative to the k-th pulse sampling moment, is only needed to be calculated in formula (3). However, if high-order items are taken into consideration in the solving process, a weighted sum of interactions of the pulses at more than three moments relative to the k-th pulse sampling moment needs to be calculated.

The pulses at three moments used for the k-th pulse are not arbitrary, and the temporal relationship between them satisfies formula (m+k)+(n+k)−(m+n+k)=k. Where, m, n and k may be equal, i.e. the pulse sampling moment may be one or more moments relative to the current moment. It should be noted that the present invention is not limited thereto, and these three pulses may have other forms of combination, with the coefficients corresponding to them needing to be modified accordingly.

Following description is given taking a weighted sum of interactions of three pulses as an example. It should be noted that the present invention is not limited thereto, and the case where there are more than three pulses is similar to the case where there are three pulses.

It can be seen from formula (3) that the perturbation item at the current polarization state is originated from two parts, and one part is originated from the local polarization state, and the other part is originated from an orthogonal polarization state. For example, for the horizontal polarization state, the part originated from the local polarization state is $A^H_{m+k} A^H_{n+k} (A^H_{m+n+k})^*$, and the part originated from the orthogonal polarization state is $A^H_{m+k} A^V_{n+k} (A^V_{m+n+k})^*$. The case of a vertical polarization state is similar to this, which shall not be described any further.

Since the symbol information of two polarization states always appears symmetrically in Manakov equation (1), such symmetry finally results in that the coefficients of the two parts of perturbation items of horizontal and vertical polarization states are identical. These coefficients are only related to the configuration of the link and the relative positions (m, n) of the interacted pulses and the pulse at the current moment.

On the basis of the above nonlinear model, specifically deformed signals are transmitted at the transmitting side, and after these signals are subjected to the nonlinear effect of optical fiber transmission, ideal undamaged signals are obtained at the receiving side. Where, it is assumed that the linear damage of the channel has been compensated for in other ways.

Furthermore, formula (4) below may be obtained in an equal-order way by sorting formula (3):

$$u_H(t = kT, z = L) = A^H_k + \qquad (4)$$

$$A^H_k \left[ \sum_n (2|A^H_{n+k}|^2 + |A^V_{n+k}|^2) C(0, n, z = L) - |A^H_k|^2 C(0, 0, z = L) \right] +$$

$$\sum_{mn \neq 0} [A^H_{m+k} A^H_{n+k} (A^H_{m+n+k})^* + A^H_{m+k} A^V_{n+k} (A^V_{m+n+k})^*] C(m, n, z = L) +$$

$$\sum_{m \neq 0} A^H_{m+k} A^V_k (A^V_{m+k})^* C(m, 0, z = L)$$

$$u_V(t = kT, z = L) = A^V_k +$$

$$A^V_k \left[ \sum_n (2|A^V_{n+k}|^2 + |A^H_{n+k}|^2) C(0, n, z = L) - |A^V_k|^2 C(0, 0, z = L) \right] +$$

$$\sum_{mn \neq 0} [A^V_{m+k} A^V_{n+k} (A^V_{m+n+k})^* + A^V_{m+k} A^H_{n+k} (A^H_{m+n+k})^*] C(m, n, z = L) +$$

$$\sum_{m \neq 0} A^V_{m+k} A^H_k (A^H_{m+k})^* C(m, 0, z = L)$$

For PSK signals, as the modulus of every symbol are identical, the factor of the second item to the right side of the equal mark in formula (4) that is multiplied on the current symbol information is a constant. In consideration that such a factor is an imaginary number, the result seen at the receiving side is a whole rotation of a constellation. Since a coherent receiver often has a phase recovery algorithm, such a rotation may be completely corrected.

Hence, in considering the actual effect of nonlinearity, the effect of such an item may be neglected, that is, the symbol information of the current moment may be discarded, and only the effect of the last two additive perturbations at the right side of the equal mark in formula (4) is considered. Therefore, formula (4) may be further rewritten into formula (5):

$$u'_H(t = kT, z = L) = u_H(t = kT, 0) + \Delta^H_k = \qquad (5)$$

$$A^H_k + \left\{ \sum_{mn \neq 0} [A^H_{m+k} A^H_{n+k} (A^H_{m+n+k})^* + A^H_{m+k} A^V_{n+k} (A^V_{m+n+k})^*] \right.$$

$$\left. C(m, n, z = L) + \sum_{m \neq 0} A^H_{m+k} A^V_k (A^V_{m+k})^* C(m, 0, z = L) \right\}$$

$$u'_V(t = kT, z = L) = u_V(t = kT, 0) + \Delta^V_k =$$

$$A^V_k + \left\{ \sum_{mn \neq 0} [A^V_{m+k} A^V_{n+k} (A^V_{m+n+k})^* + A^V_{m+k} A^H_{n+k} (A^H_{m+n+k})^*] \right.$$

$$\left. C(m, n, z = L) + \sum_{m \neq 0} A^V_{m+k} A^H_k (A^H_{m+k})^* C(m, 0, z = L) \right\}$$

For other non-constant modulus modulation signals, such as quadrature amplitude modulation (QAM) or orthogonal frequency division multiplexing (OFDM), etc., when the accumulated dispersion on the link is very large, the number of interacted pulses is very great; and due to an average effect, the phase rotations introduced by the nonlinearity are approximately equal and therefore, formula (5) is still valid. An additive distortion introduced by the nonlinearity is only taken into consideration in formula (5). For polarization multiplexed signals, the perturbation is originated from the local polarization state and the orthogonal polarization state.

The above description is given taking dual polarization signals as an example. If single polarization signals are transmitted in the channel, formula (5) may be further simplified into formula (6):

$$u'(t=kT, z=L) = u(t=kT, 0) + \Delta_k = A_k + \sum_{mn \neq 0} A_{m+k} A_{n+k} A^*_{m+n+k} C(m, n, z=L) \quad (6)$$

C(m, n, z=L) correspond to weighted coefficients the m-th, the n-th and the (m+n)-th pulse interactions relative to the current moment. It should be pointed out here that in a polarization multiplexing system, three interacted pulses may be originated from the same polarization state, and may also be originated from different polarization states. And the weighted coefficient to which each item corresponds may be obtained in advance.

Where, when the weighted coefficient is obtained on the basis of simulation and experiment, different transmission signals may be designed in the simulation or experiment, and the value of the weighted coefficient is derived inversely according to the received signals. And the accuracy of such a method is high.

Where, when the weighted coefficient of each of the items is obtained according to the configuration of the transmission link and the positions of pulses interacted on one or more moments relative to the position of the pulses on the current moment, the weighted coefficient may be calculated by using the following formula:

$$C(m, n, z=L) = j \int_0^L \frac{\gamma(z)p(z)}{\sqrt{1 + 2js(z)/\tau^2 + 3(s(z)/\tau^2)^2}} \exp\left\{-\frac{3mnT^2}{\tau^2(1+3js(z)/\tau^2)} - \frac{(m-n)^2 T^2}{\tau^2[1+2js(z)/\tau^2 + 3(s(z)/\tau^2)^2]}\right\} dz \quad (7)$$

Where, if the current moment is the k-th moment, the three moments relative to the current moment are the (m+k)-th moment, the (n+k)-th moment and the (m+n+k)-th moment; and as for preset several (m, n) values, each value corresponds to different weighted coefficients C(m, n, z=L). Where, the values of m and n may be any values in the range from minus infinity to plus infinity, and are related to all the values before and after the k-th moment.

Furthermore, it is usually that as the absolute values of (m, n) values increase, the absolute values of corresponding C(m, n, z=L) values decrease. Hence, a certain number of (m, n) values may be taken for calculating perturbation quantity according to a required accuracy of calculation.

Thus, the values of m and n may be taken in the following manner: in taking m and n, when the modulus |C(m, n, z=L)| of the weighted coefficient C(m, n, z=L) obtained according to m and n is greater than or equal to a predefined value, m and n are taken; otherwise, m and n are not taken. The predefined value may be set according to a certain proportional coefficient of the maximum modulus of all the coefficients. For example, normalized coefficients C may be taken from all the combinations of m and n satisfying |C(m, n, z=L)|>1e-3* max(|C(m, n, z=L)|).

Where, p (z) denotes the power of the signal on the transmission link spaced apart from the transmitting side by z, s(z) denotes the accumulated net dispersion value on the transmission link spaced apart from the transmitting side by z, $\tau$ denotes a half value width of the pulse, T denotes a pulse interval, and $\gamma(z)$ denotes the nonlinear coefficient on the transmission link spaced apart from the transmitting side by z;

or, when the transmission link does not contain a dispersion compensating module, the attenuation in the transmission of the signals is neglected, and the dispersion coefficient and the nonlinear coefficient do not vary along with the distance of transmission, the weighted coefficient may further be calculated by using the following formula:

$$C(m, n, z=L) = j \frac{\gamma p_0 \tau^2}{\sqrt{3} |\beta_2|} \text{expint}\left(-j\frac{mnT^2}{\beta_2 L}\right) \quad (8)$$

where, $\gamma$ denotes the nonlinear coefficient, $p_0$ denotes the power of the signal at the transmitting side, $\beta_2$ denotes the dispersion coefficient, and exp int denotes an exponential integral function, the integral function being capable of expressed as $$\text{expint}(z) = \int_z^\infty \frac{e^{-x}}{x} dx.$$

Furthermore, the obtained weighted coefficients may be stored for use in calculating the weighted values. And channel coefficients for calculating the weighted coefficients may also be stored, such as the nonlinear coefficient $\gamma$, the dispersion coefficient $\beta_2$, and the length L of the transmission link, etc.

The above nonlinear precompensating model has low complexity relative to a nonlinear filter based on channel inversion and implemented in a receiver side. Wherein the distortion introduced by the nonlinearity is a sum of interacted items, the multiplication of the information symbols in each item being obtained by logic operation. Therefore, the number of pieces of the multiplication needed in precompensation is the number of the interacted items. And if the modulation format of the system is a phase modulation system (such as BPSK and QPSK, etc.), the multiplication between the information symbols and the coefficients may be obtained by logic operation, and the precompensating method needs no multiplicative operation.

Hence, for a phase modulation system, the complexity of hardware is mainly dependent on the complexity of the complex additions and the number of the complex additions. Wherein, the number of the complex additions equals to the number of the items in formula (5) or (6). And when the residual dispersion of the link is relatively large, in order to obtain a better effect of compensation, the number of the items in formula (5) or (6) is also relatively large, which results in relatively high complexity of calculation, and puts forward a relatively high requirement on the hardware.

On the basis of the above analysis, the nonlinear compensating apparatus and method and transmitter of the embodiments of the present invention shall be described in detail, taking the optical communication system shown in FIG. 1 and the nonlinear model based on the communication system as an example.

Figure 2:
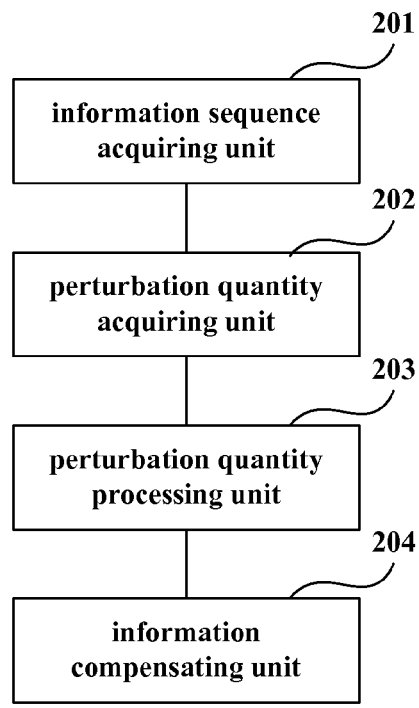
FIG. 2 is a schematic diagram of the nonlinear compensating apparatus of the embodiments of the present invention.

FIG. 2 is a schematic diagram of the nonlinear compensating apparatus of the embodiments of the present invention. As shown in FIG. 2, the nonlinear compensating apparatus includes an information sequence acquiring unit 201, a perturbation quantity acquiring unit 202, a perturbation quantity processing unit 203 and an information compensating unit 204.

Wherein, the information sequence acquiring unit 201 is used for acquiring a symbol information sequence of the pulse signal inputted by a transmitting side, the perturbation quantity acquiring unit 202 is used for calculating, by pre-obtained weighting coefficients to which each item corresponds, the weighted sum of interaction items of pulses on one or more moments relative to the current moment, to obtain the perturbation quantity produced on a transmission link with a certain length, the perturbation quantity processing unit 203 is used for combining the items of the perturbation quantity based on the weighting coefficients, so as to transform complex addition into a combination of addition and multiplication of symbols in a finite symbol set, and the information compensating unit 204 is used for calculating a difference between the symbol information sequence and the processed perturbation quantity to obtain a compensated symbol information sequence, so as to cause the transmitting side to transmit signals according to the compensated symbol information sequence.

In this embodiment, the symbol information sequence obtained by the information sequence acquiring unit 201 is symbol information before compensation; wherein the symbol information is related to the used modulation format, and the symbol information is different for different modulation formats. For example, for the OOK modulation format, the symbol information sequence is 0, 1; for the BPSK modulation format, the symbol information sequence is −1, 1; and for the QPSK modulation format, the symbol information sequence is 1, j, −1, −j.

In this embodiment, the perturbation quantity acquiring unit 202 may be used for calculating a perturbation quantity for each transmitting symbol (transmitting moment), the perturbation quantity being equal to a weighted sum of a plurality of interacted items, wherein each of the interacted items refers to a product of one or more different symbols.

In this embodiment, the perturbation quantity processing unit 203 may be particularly used for combining the items to which equal or approximately equal weighting coefficients correspond, or combining the items to which the real parts of weighting coefficients correspond, or combining the items to which the imaginary parts of weighting coefficients correspond.

In particular, in order to further lower the complexity of hardware, the items in formula (5) or (6) may be combined according to the properties of the coefficients $C(m, n)$. And the items to which equal or approximately equal $C(m, n)$ correspond, or the items to which the real parts or imaginary correspond are combined, the original complex addition of high accuracy may be substituted by the addition of symbols in a finite symbol set, and complex multiplication is introduced at the same time.

In this way, the number of complex additions in formula (5) or (6) may be greatly reduced, thereby lowering the complexity. When the transmitted data are in the QPSK format, the product of three QPSK symbols is still in the QPSK format. And at the same time, the addition of N QPSK symbols may be deemed as calculating the number of 1s (or 0s) in N binary numbers, with the complexity of hardware of such an operation being far lower than that of the addition of N arbitrary complexes.

In this embodiment, the information compensating unit 204 may be particularly used for obtaining a compensated symbol information sequence of the current moment by subtracting the perturbation quantity obtained by the perturbation quantity processing unit 203 from the symbol information sequence obtained by the information sequence acquiring unit 201.

In particular implementation, a corresponding hardware circuit may be used, which may be implemented by an adder, a multiplier, or a logic operation circuit, etc. For example, for PSK signals, the multiplication between the symbols may be realized by a lookup table, and the multiplication between PSK signals and the Coef may be realized by logic operation and an adder. Existing elements may be used in implementation, which shall not be described any further.

In this embodiment, the perturbation quantity acquiring unit 202 may obtain symbol information of the pulses of each item in a plurality of items at one or more moments relative to the current moment, use the symbol information of the pulses of each item in a plurality of items at one or more moments relative to the current moment and a pre-obtained weighting coefficient to which each item corresponds to calculate a weighted value of interaction of the pulse in each item at one or more moments relative to the current moment, and calculate a sum of weighted values of a plurality of items according to the weighted value of each item, so as to obtain a perturbation quantity produced on a transmission link with a certain length.

Following description is given, taking calculation of a weighted sum of interactions of the pulses at the $(m+k)$-th moment, the $(n+k)$-th moment and the $(m+n+k)$-th moment, relative to the k-th pulse sampling moment, as an example. Wherein the number of the items for calculating a weighted sum of interactions of pulses of several items on three moments relative to the current moment is determined by a predefined $(m, n)$ value.

It should be noted that m, n and k satisfy formula $(m+k)+(n+k)-(m+n+k)=k$. Where, m, n and k may be equal, i.e. the pulse sampling moments may be one or more moments relative to the current moment.

Furthermore, in a particular embodiment, $mn \neq 0$ denotes that either of m and n is not equal to 0. Thus, $(m+k)$ and $(n+k)$ may be equal, but not equal to $(m+n+k)$, that is, the pulse sampling moments may be at least two moments relative to the current moment.

Therefore, the perturbation quantity acquiring unit 202 may be particularly used to calculate a weighted sum of interactions of pulses at three moments, such as the $(m+k)$-th moment, the $(n+k)$-th moment and the $(m+n+k)$-th moment, relative to the current moment, such as the k-th moment, so as to obtain perturbation quantity of the nonlinear effect of the current k-th moment in passing a transmission link with a certain length.

How to obtain a perturbation quantity by the perturbation quantity acquiring unit 202 is illustrated above. And how to combine the items by the perturbation quantity processing unit 203 shall be described in detail below for single-polarization signals and dual-polarization signals.

In this embodiment, as the coefficient $C(m, n, z=L)$ itself is a complex, the items to be added in formula (5) or (6) are arbitrary complexes. The coefficient $C(m, n, z=L)$ may have some properties; for example, when $m*n \neq 0$), the coefficient is only related to a product of m and n; and when $m*n \neq 0$ and the symbol of $m*n$ is inversed, the imaginary part of the coefficient is kept constant, and the real part is inversed. When $n=0$, the real part is far less than the imaginary part of the coefficient, thus, it can be neglected; and when $n=0$, the coefficient is related to a modulus of m, etc.

It should be noted that the description of the properties of coefficient $C(m, n, z=L)$ above is illustrative only. However, it is not limited thereto, and items of the perturbation quantity may be combined according to other properties of the coefficient, so that the complex addition is transferred into a combination of addition and multiplication of the symbols in a finite symbol set, and those skilled in the art determine particular manners of implementation as actually required.

In particular, for single polarization signals, the perturbation quantity acquiring unit 202 may first use the following formula to calculate a sum of weighted values of a plurality of items:

$$\Delta_k = \sum_{mn \neq 0} A_{m+k} A_{n+k} A_{m+n+k}^* C(m, n, z = L) \tag{9}$$

where, $\Delta_k$ denotes a sum of weighted values of several items at the k-th moment, $C(m, n, z=L)$ denotes a weighted coefficient of each of the items at L in the transmission link, $A_{m+k}$ and $A_{n+k}$ denote respectively symbol information of the pulses at the (m+k)-th moment and the (n+k)-th moment, and $(A_{m+n+k}^V)^*$ denotes the conjugation of the symbol information of the pulse at the (m+n+k)-th moment.

Then the perturbation quantity processing unit 203 may combine particular items of the same type according part or all of the properties of coefficient $C(m, n, z=L)$. For example, when $m*n \neq 0$, the coefficient is only related to a product of m and n; and the formula below is used in combining the items of the perturbation quantity:

$$\Delta_k = \sum_{a \neq 0} \mathrm{Re}[C(mn = a, z = L)] \sum_{\substack{mn \neq 0 \\ mn = a}} [A_{m+k} A_{n+k} (A_{m+n+k})^*] + \tag{10}$$

$$j \sum_{a \neq 0} \mathrm{Im}[C(mn = a, z = L)] \sum_{\substack{mn \neq 0 \\ mn = a}} [A_{m+k} A_{n+k} (A_{m+n+k})^*]$$

where, Re( ) denotes that a real part is taken, and Im( ) denotes that an imaginary part is taken. In comparison with formula (9), double summation of m and n is changed into singular summation of a product a of m and n.

Or, when $m*n \neq 0$, the coefficient is only related to a product of m and n; and when $m*n \neq 0$ and the symbol of $m*n$ is inversed, the imaginary part of the coefficient is kept constant, and the real part is inversed. The perturbation quantity processing unit 203 uses formula below in combining the items of the perturbation quantity:

$$\Delta_k = \sum_{a > 0} \mathrm{Re}[C(mn = a, z = L)] \left\{ \sum_{\substack{mn \neq 0 \\ mn = a}} [A_{m+k} A_{n+k} (A_{m+n+k})^*] - \right. \tag{11}$$

$$\left. \sum_{\substack{mn \neq 0 \\ mn = -a}} [A_{m+k} A_{n+k} (A_{m+n+k})^*] \right\} +$$

$$j \sum_{a > 0} \mathrm{Im}[C(mn = a, z = L)] \left\{ \sum_{\substack{mn \neq 0 \\ mn = a}} [A_{m+k} A_{n+k} (A_{m+n+k})^*] + \right.$$

$$\left. \sum_{\substack{mn \neq 0 \\ mn = -a}} [A_{m+k} A_{n+k} (A_{m+n+k})^*] \right\}$$

Particularly, for dual polarization signals, the perturbation quantity acquiring unit 202 may first use the following formula to calculate a sum of weighted values of a plurality of items:

$$\Delta_k^H = \tag{12}$$

$$\left\{ \sum_{mn \neq 0} [A_{m+k}^H A_{n+k}^H (A_{m+n+k}^H)^* + A_{m+k}^H A_{n+k}^V (A_{m+n+k}^V)^*] C(m, n, z = L) + \right.$$

$$\left. \sum_{m \neq 0} A_{m+k}^H A_k^V (A_{m+k}^V)^* C(m, 0, z = L) \right\}$$

$$\Delta_k^V = \left\{ \sum_{mn \neq 0} [A_{m+k}^V A_{n+k}^V (A_{m+n+k}^V)^* + \right.$$

$$A_{m+k}^V A_{n+k}^H (A_{m+n+k}^H)^*] C(m, n, z = L) +$$

$$\left. \sum_{m \neq 0} A_{m+k}^V A_k^H (A_{m+k}^H)^* C(m, 0, z = L) \right\}$$

where, $\Delta_k^H$ and $\Delta_k^V$ denote respectively a sum of weighted values of several items at the k-th moment at the horizontal polarization state and the vertical polarization state, $C(m, n, z=L)$ denotes a weighted coefficient of each of the items, $A_{m+k}^H$ and $A_{m+k}^V$ denote respectively symbol information of the pulses at the (m+k)-th moment at the horizontal polarization state and the vertical polarization state, $A_{n+k}^H$ and $A_{n+k}^V$ denote respectively symbol information of the pulses at the (n+k)th moment at the horizontal polarization state and the vertical polarization state, and $(A_{m+n+k}^H)^*$ and $(A_{m+n+k}^V)^*$ denote respectively the conjugation of the symbol information of the pulse at the (m+n+k)-th moment at the horizontal polarization state and the vertical polarization state.

Then the perturbation quantity processing unit 203 may combine particular items of the same type according part or all of the properties of coefficient $C(m, n, z=L)$. For example, when $m*n \neq 0$, the coefficient is only related to a product of m and n; and when n=0, the real part is far less than the imaginary part of the coefficient, thus, its real part is a property that can be neglected. The formula below is used in combining the items of the perturbation quantity. Wherein, m and n are integers, and a=m×n and is not equal to 0.

$$\Delta_k^H = \sum_{a \neq 0} \mathrm{Re}[C(mn = a, z = L)] \sum_{\substack{mn \neq 0 \\ mn = a}} [A_{m+k}^H A_{n+k}^H (A_{m+n+k}^H)^* + \tag{13}$$

$$A_{m+k}^H A_{n+k}^V (A_{m+n+k}^V)^*] +$$

$$j \sum_{a \neq 0} \mathrm{Im}[C(mn = a, z = L)] \sum_{\substack{mn \neq 0 \\ mn = a}} [A_{m+k}^H A_{n+k}^H (A_{m+n+k}^H)^* +$$

$$A_{m+k}^H A_{n+k}^V (A_{m+n+k}^V)^*] +$$

$$j \sum_{m \neq 0} [A_{m+k}^H A_k^V (A_{m+k}^V)^* + A_{-m+k}^H A_k^V (A_{-m+k}^V)^*] \mathrm{Im}(C(m, 0, z = L)]$$

-continued $$\Delta_k^V = \sum_{a \neq 0} \text{Re}[C(mn = a, z = L)] \sum_{\substack{mn \neq 0 \\ mn = a}} [A_{m+k}^V A_{n+k}^V (A_{m+n+k}^V)^* +$$

$$A_{m+k}^V A_{n+k}^H (A_{m+n+k}^H)^*] +$$

$$j \sum_{a \neq 0} \text{Im}[C(mn = a, z = L)] \sum_{\substack{mn \neq 0 \\ mn = a}} [A_{m+k}^V A_{n+k}^V (A_{m+n+k}^V)^* +$$

$$A_{m+k}^V A_{n+k}^H (A_{m+n+k}^H)^*] +$$

$$j \sum_{m \neq 0} [A_{m+k}^V A_k^H (A_{m+k}^H)^* + A_{-m+k}^V A_k^H (A_{-m+k}^H)^*] \text{Im}(C(m, 0, z = L))$$

Or, when m*n≠0, the coefficient is only related to a product of m and n; and when m*n≠0 and the symbol of m*n is inversed, the imaginary part of the coefficient is kept constant, and the real part is inversed. When n=0, the real part is far less than the imaginary part of the coefficient, thus, it can be neglected; and when n=0, the coefficient is only related to a modulus of m. The perturbation quantity processing unit 203 uses formula below in combining the items of the perturbation quantity:

$$\Delta_k^H = \sum_{a>0} \text{Re}[C(mn = a, z = L)] \tag{14}$$

$$\left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] - \right.$$

$$\left. \sum_{\substack{mn \neq 0 \\ mn = -a}} [A_{m+k}^H A_{n+k}^H (A_{m+n+k}^H)^* + A_{m+k}^H A_{n+k}^V (A_{m+n+k}^V)^*] \right\} +$$

$$j \sum_{a>0} \text{Im}[C(mn = a, z = L)]$$

$$\left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] + \right.$$

$$\left. \sum_{\substack{mn \neq 0 \\ mn = -a}} [A_{m+k}^H A_{n+k}^H (A_{m+n+k}^H)^* + A_{m+k}^H A_{n+k}^V (A_{m+n+k}^V)^*] \right\} +$$

$$j \sum_{m>0} [A_{m+k}^H A_k^V (A_{m+k}^V)^* + A_{-m+k}^H A_k^V (A_{-m+k}^V)^*] \text{Im}(C(m, 0, z = L))$$

$$\Delta_k^V = \sum_{a>0} \text{Re}[C(mn = a, z = L)]$$

$$\left\{ \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] - \right.$$

$$\left. \sum_{\substack{mn \neq 0 \\ mn = -a}} [A_{m+k}^V A_{n+k}^V (A_{m+n+k}^V)^* + A_{m+k}^V A_{n+k}^H (A_{m+n+k}^H)^*] \right\} +$$

$$j \sum_{a>0} \text{Im}[C(mn = a, z = L)]$$

$$\left\{ \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] + \right.$$

$$\left. \sum_{\substack{mn \neq 0 \\ mn = -a}} [A_{m+k}^V A_{n+k}^V (A_{m+n+k}^V)^* + A_{m+k}^V A_{n+k}^H (A_{m+n+k}^H)^*] \right\} +$$

$$j \sum_{m>0} [A_{m+k}^V A_k^H (A_{m+k}^H)^* + A_{-m+k}^V A_k^H (A_{-m+k}^H)^*] \text{Im}(C(m, 0, z = L))$$

Wherein, m and n are integers, and a=m×n and is not equal to 0.

In practical applications, the real part and the imaginary part of the coefficient may be quantified, respectively, so as to combine more items, and further lower the complexity of the hardware. That is, the perturbation quantity processing unit 203 may quantify the weighting coefficient before combining the items to which the weighting coefficient corresponds.

In particular implementation, the weighting coefficient may be quantified in an equally-spaced manner. For example, it may be defined that the numerical values of 0-1 are quantified into 1, the numerical values of 1-2 are quantified into 2, the numerical values of 2-3 are quantified into 3, and so forth; if the value of coefficient C(m, n, z=L) is 2.6+1.3j, the quantified numerical value is 3+2j. However, it is not limited thereto, and the weighting coefficient may be quantified in an unequally-spaced manner. For example, it may be defined that the numerical values of 0-1 are quantified into 1, the numerical values of 1-10 are quantified into 5, the numerical values greater than 10 are quantified into 10.

It should be noted that the quantification is illustrated above, and particular manners of implementation may be determined as actually required. The quantification above may be performed to each item of the weighting coefficient respectively, and different criteria may be adopted.

Particularly, when the inputted signals are single polarization signals, the perturbation quantity processing unit 203 may use the formula below in combining the items of the perturbation quantity:

$$\Delta_k = \tag{15}$$

$$\sum_p R_p \left\{ \sum_{\substack{mn \neq 0 \\ R_p}} [A_{m+k} A_{n+k} (A_{m+n+k})^*] - \sum_{\substack{mn \neq 0 \\ -R_p}} [A_{m+k} A_{n+k} (A_{m+n+k})^*] \right\} +$$

$$j \sum_q I_q \left\{ \sum_{\substack{mn \neq 0 \\ I_q}} [A_{m+k} A_{n+k} (A_{m+n+k})^*] + \sum_{\substack{mn \neq 0 \\ -I_q}} [A_{m+k} A_{n+k} (A_{m+n+k})^*] \right\}$$

where, $\Delta_k$ denotes a sum of the weighting values of several items on the k-th moment, C(m, n, z=L) denotes the weighting coefficient of each item at a transmission link L, $R_p$ and $I_q$ are respectively representative of the real part and the imaginary part of the quantified coefficient C(mn≠0, z=L), with m and n being integers, p and q are respectively representative of different quantitative levels, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

When the inputted signals are dual polarization signals, the perturbation quantity processing unit 203 uses the following formula in combining the items of the perturbation quantity:

$$\Delta_k^H = \qquad (16)$$

$$\sum_p R_p \left\{ \sum_{\substack{mn \neq 0 \\ R_p}} [A_{m+k}^H A_{n+k}^H (A_{m+n+k}^H)^* + A_{m+k}^H A_{n+k}^V (A_{m+n+k}^V)^*] - \sum_{\substack{mn \neq 0 \\ -R_p}} [A_{m+k}^H A_{n+k}^H (A_{m+n+k}^H)^* + A_{m+k}^H A_{n+k}^V (A_{m+n+k}^V)^*] \right\} +$$

$$j \sum_q I_q \left\{ \sum_{\substack{mn \neq 0 \\ I_q}} [A_{m+k}^H A_{n+k}^H (A_{m+n+k}^H)^* + A_{m+k}^H A_{n+k}^V (A_{m+n+k}^V)^*] + \sum_{\substack{mn \neq 0 \\ -I_q}} [A_{m+k}^H A_{n+k}^H (A_{m+n+k}^H)^* + A_{m+k}^H A_{n+k}^V (A_{m+n+k}^V)^*] \right\} +$$

$$j \sum_s D_s \sum_{D_s} [A_{m+k}^H A_k^V (A_{m+k}^V)^* + A_{-m+k}^H A_k^V (A_{-m+k}^V)^*]$$

$$\Delta_k^V = \sum_p R_p \left\{ \sum_{\substack{mn \neq 0 \\ R_p}} [A_{m+k}^V A_{n+k}^V (A_{m+n+k}^V)^* + A_{m+k}^V A_{n+k}^H (A_{m+n+k}^H)^*] - \sum_{\substack{mn \neq 0 \\ -R_p}} [A_{m+k}^V A_{n+k}^V (A_{m+n+k}^V)^* + A_{m+k}^V A_{n+k}^H (A_{m+n+k}^H)^*] \right\} +$$

$$j \sum_q I_q \left\{ \sum_{\substack{mn \neq 0 \\ I_q}} [A_{m+k}^V A_{n+k}^V (A_{m+n+k}^V)^* + A_{m+k}^V A_{n+k}^H (A_{m+n+k}^H)^*] + \sum_{\substack{mn \neq 0 \\ -I_q}} [A_{m+k}^V A_{n+k}^V (A_{m+n+k}^V)^* + A_{m+k}^V A_{n+k}^H (A_{m+n+k}^H)^*] \right\} +$$

$$j \sum_s D_s \sum_{D_s} [A_{m+k}^V A_k^H (A_{m+k}^H)^* + A_{-m+k}^V A_k^H (A_{-m+k}^H)^*]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, $R_p$ and $I_q$ are respectively representative of the real part and the imaginary part of the quantified coefficient C(mn≠0, z=L), and $D_s$ is representative of the imaginary part of the quantified coefficient C(m, 0, z=L), p, q and s are respectively representative of different quantitative levels, $A_{m+k}^H$ and $A_{m+k}^V$ respectively denote the symbol information of the pulses on the (m+k)-th moment at the horizontal polarization state and the vertical polarization state, $A_{n+k}^H$ and $A_{m+k}^V$ respectively denote the symbol information of the pulses on the (n+k)-th moment at the horizontal polarization state and the vertical polarization state, $(A_{m+n+k}^H)^*$ and $(A_{m+n+k}^V)^*$ and respectively denote the conjugation of the symbol information of the pulses on the (m+n+k)-th moment at the horizontal polarization state and vertical polarization state.

Wherein, the real part and imaginary part of coefficient C(m, n, z=L) with m*n≠0 may be quantified respectively in to $R_p$ and $I_q$, where, p and q are respectively representative of different quantitative levels. And as for coefficient C(m, n, z=L) with n=0, since the real part is far less than the imaginary part, the contribution of the imaginary part may only be taken into consideration; and the imaginary part is quantified as $D_s$, where, s is representative of different quantitative levels.

How to implement the perturbation quantity processing unit 203 is described above in detail. It should be noted that appropriate variants and modifications may be made by those skilled in the art according to what is disclosed above. The formulae of the present invention are illustrative only, and are not limited thereto.

In this embodiment, the perturbation quantity processing unit 203 may further be used to rotate the obtained perturbation quantity by a predefined phase, and adjust the perturbation quantity with a predefined amplitude coefficient. And it was found in simulation that this may further improve the performance of the system efficiently.

Therefore, for single polarization signals, the information compensating unit 204 may use the following formula:

$$B_k = A_k - \xi e^{j\theta} \Delta_k \qquad (17)$$

where, $\xi$ denotes the amplitude coefficient, $\theta$ denotes the phase, and $\Delta_k$ denotes the above perturbation quantity after the items are combined.

For dual polarization signals, the information compensating unit 204 may use the following formula:

$$B_k^H = A_k^H - \xi e^{j\theta} \Delta_k^H$$

$$B_k^V = B_k^H - \xi e^{j\theta} \Delta_k^V \qquad (18)$$

where, $\xi$ denotes the amplitude coefficient, $\theta$ denotes the phase, and $\Delta_k^H$ and $\Delta_k^V$ denote respectively the above perturbation quantity after the items are combined. In general, the amplitude coefficient $\xi$ is a real number greater than 0 and less than 1, the greater the nonlinearity of the system, the less the amplitude coefficient $\xi$ is. Particular numerical values may be acquired in an existing optimization method, for example, by monitoring the performance of the system, such as code error rate, etc., at the receiver side.

It was proved by simulation that in a 1500 km-long optical fiber link of all-common single-mode optical fiber, after the coefficients are quantitatively combined and the items of the same type are combined, the complex addition may be reduced by 100 times, and at the same time, the cost of performance of the system is only 0.1 dB.

It can be seen from the above embodiment that the nonlinear compensating apparatus may compensate for the symbol information of the pulse signals inputted by a transmitting side, and if the apparatus is applied in a transmitter, the transmitter can shape and modulate the pulses by using the compensated symbol information, and then transmit the signals; and after these signals are subjected to the nonlinear effect of optical fiber transmission, ideal undamaged signals may be obtained at the receiver.

And by combining pulse interactive items according to properties of weighting coefficients, the complex addition may be transferred into a combination of addition and multiplication of the symbols in a finite symbol set, thereby further lowering the complexity of calculation and lowering the requirements on the hardware.

Figure 3:
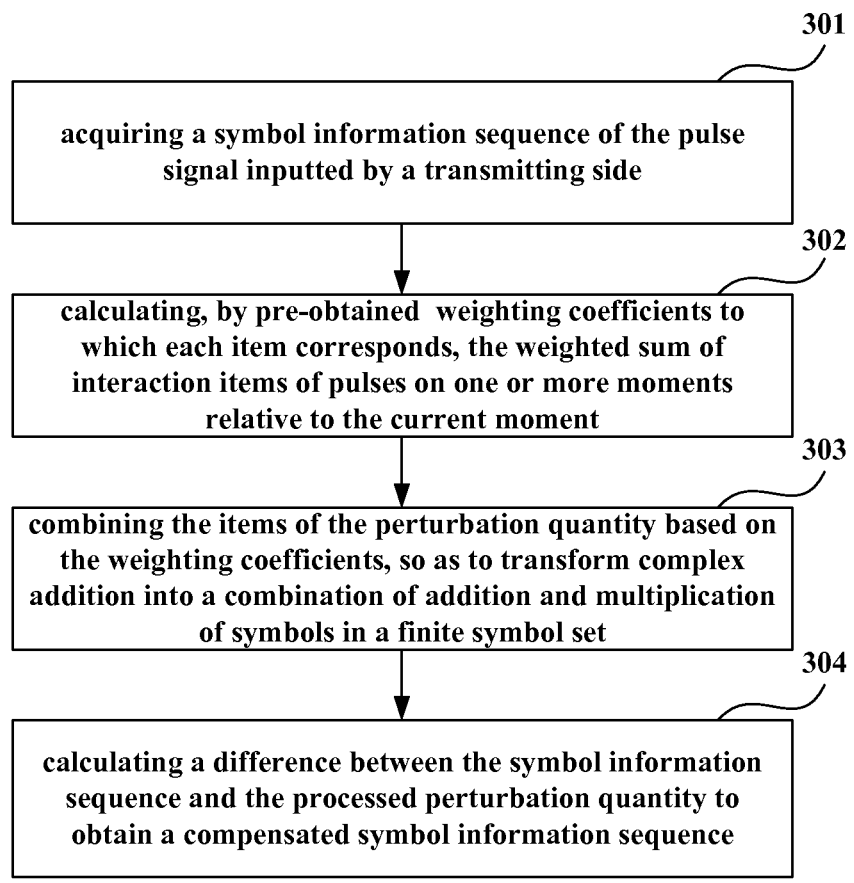
FIG. 3 is a flowchart of the nonlinear compensating method of the embodiments of the present invention.

The embodiments of the present invention further provide a nonlinear compensating method. FIG. 3 is a flowchart of the nonlinear compensating method of the embodiments of the present invention. And the parts identical to those in the above embodiments shall not be described any further.

As shown in FIG. 3, the nonlinear compensating method includes:

step 301: acquiring a symbol information sequence of the pulse signal inputted by a transmitting side;

step 302: calculating, by pre-obtained weighting coefficients to which each item corresponds, the weighted sum of interaction items of pulses on one or more moments relative to the current moment, to obtain the perturbation quantity produced on a transmission link with a certain length;

step 303: combining the items of the perturbation quantity based on the weighting coefficients, so as to transform complex addition into a combination of addition and multiplication of symbols in a finite symbol set; and step 304: calculating a difference between the symbol information sequence and the processed perturbation quantity to obtain a compensated symbol information sequence, so as to cause the transmitting side to transmit signals according to the compensated symbol information sequence.

Furthermore, the combining the items of the perturbation quantity based on the weighting coefficients in step 303 may include: combining the items to which the equal or approximately equal weighting coefficients correspond, or combining the items to which the real parts of the weighting coefficients correspond, or combining the items to which the imaginary parts of the weighting coefficients correspond.

In an embodiment, when the inputted signals are dual polarization signals, the formula below may be used in combining the items of the perturbation quantity based on the weighting coefficients in step 303:

$$\Delta_k^H = \sum_{a \neq 0} \text{Re}[C(mn = a, z = L)] \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] +$$

$$j \sum_{a \neq 0} \text{Im}[C(mn = a, z = L)] \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] +$$

$$j \sum_{m \neq 0} [A_{m+k}^H A_k^V (A_{m+k}^V)^* + A_{-m+k}^H A_k^V (A_{-m+k}^V)^*] \text{Im}(C(m, 0, z = L)]$$

$$\Delta_k^V = \sum_{a \neq 0} \text{Re}[C(mn = a, z = L)] \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] +$$

$$j \sum_{a \neq 0} \text{Im}[C(mn = a, z = L)] \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] +$$

$$j \sum_{m \neq 0} [A_{m+k}^V A_k^H (A_{m+k}^H)^* + A_{-m+k}^V A_k^H (A_{-m+k}^H)^*] \text{Im}[C(m, 0, z = L)]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

In another embodiment, when the inputted signals are dual polarization signals, the formula below may be used in combining the items of the perturbation quantity based on the weighting coefficients in step 303:

$$\Delta_k^H = \sum_{a > 0} \text{Re}[C(mn = a, z =$$

$$L)] \left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] - \right.$$

$$\left. \sum_{\substack{mn \neq 0 \\ mn = -a}} [A_{m+k}^H A_{n+k}^H (A_{m+n+k}^H)^* + A_{m+k}^H A_{n+k}^V (A_{m+n+k}^V)^*] \right\} +$$

$$j \sum_{a > 0} \text{Im}[C(mn = a, z = L)] \left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] + \right.$$

$$\left. \sum_{\substack{mn \neq 0 \\ mn = -a}} [A_{m+k}^H A_{n+k}^H (A_{m+n+k}^H)^* + A_{m+k}^H A_{n+k}^V (A_{m+n+k}^V)^*] \right\} +$$

$$j \sum_{m > 0} [A_{m+k}^H A_k^V (A_{m+k}^V)^* + A_{-m+k}^H A_k^V (A_{-m+k}^V)^*] \text{Im}(C(m, 0, z = L)]$$

$$\Delta_k^V = \sum_{a > 0} \text{Re}[C(mn = a, z =$$

$$L)] \left\{ \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] - \right.$$

$$\left. \sum_{\substack{mn \neq 0 \\ mn = -a}} [A_{m+k}^V A_{n+k}^V (A_{m+n+k}^V)^* + A_{m+k}^V A_{n+k}^H (A_{m+n+k}^H)^*] \right\} +$$

$$j \sum_{a > 0} \text{Im}[C(mn = a, z = L)] \left\{ \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] + \right.$$

$$\left. \sum_{\substack{mn \neq 0 \\ mn = -a}} [A_{m+k}^V A_{n+k}^V (A_{m+n+k}^V)^* + A_{m+k}^V A_{n+k}^H (A_{m+n+k}^H)^*] \right\} +$$

$$j \sum_{m > 0} [A_{m+k}^V A_k^H (A_{m+k}^H)^* + A_{-m+k}^V A_k^H (A_{-m+k}^H)^*] \text{Im}(C(m, 0, z = L)]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

In still another embodiment, when the inputted signals are single polarization signals, the formula below may be used in combining the items of the perturbation quantity based on the weighting coefficients in step 303:

$$\Delta_k = \sum_{a \neq 0} \text{Re}[C(mn=a, z=L)] \sum_{\substack{mn \neq 0 \\ mn=a}} [A_{m+k} A_{n+k} (A_{m+n+k})^*] + j \sum_{a \neq 0} \text{Im}[C(mn=a, z=L)] \sum_{\substack{mn \neq 0 \\ mn=a}} [A_{m+k} A_{n+k} (A_{m+n+k})^*]$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

In a further embodiment, when the inputted signals are single polarization signals, the formula below may be used in combining the items of the perturbation quantity based on the weighting coefficients in step 303:

$$\Delta_k = \sum_{a > 0} \text{Re}[C(mn=a, z=L)] \left\{ \sum_{\substack{mn \neq 0 \\ mn=a}} [A_{m+k} A_{n+k} (A_{m+n+k})^*] - \sum_{\substack{mn \neq 0 \\ mn=-a}} [A_{m+k} A_{n+k} (A_{m+n+k})^*] \right\} + j \sum_{a > 0} \text{Im}[C(mn=a, z=L)] \left\{ \sum_{\substack{mn \neq 0 \\ mn=a}} [A_{m+k} A_{n+k} (A_{m+n+k})^*] + \sum_{\substack{mn \neq 0 \\ mn=-a}} [A_{m+k} A_{n+k} (A_{m+n+k})^*] \right\}$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

Figure 4:
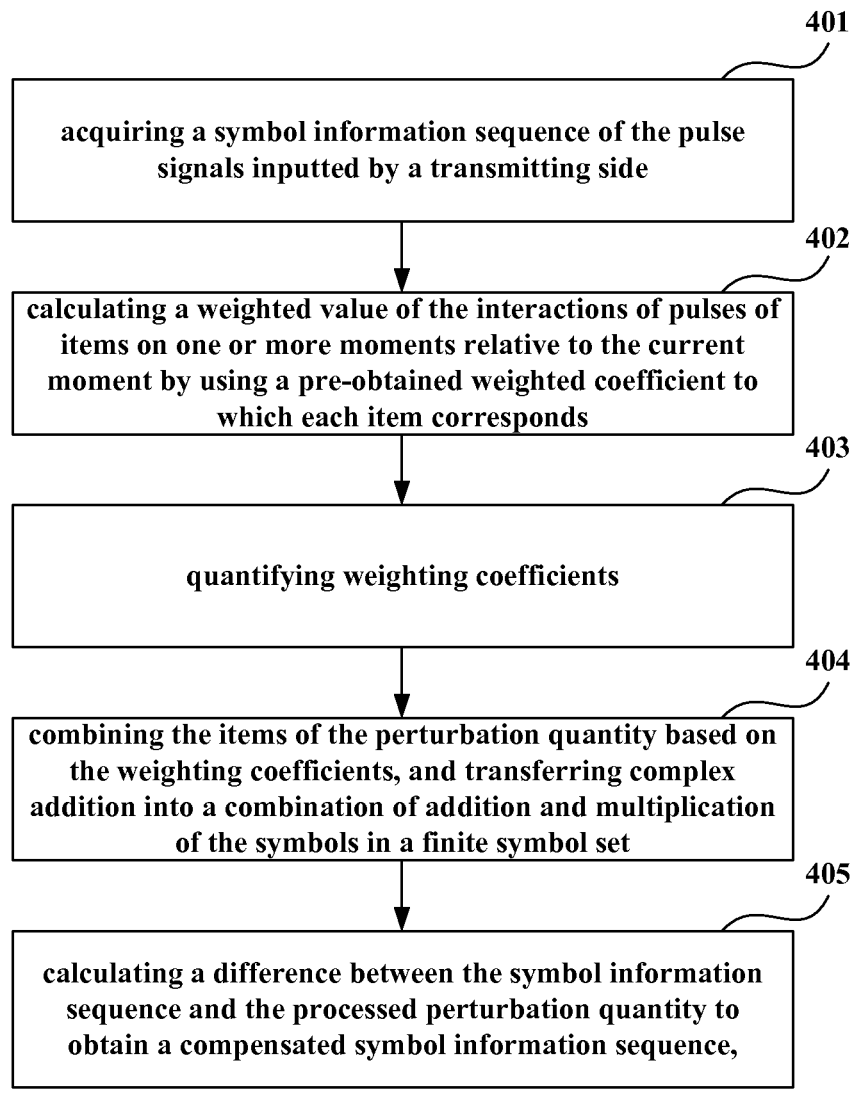
FIG. 4 is another flowchart of the nonlinear compensating method of the embodiments of the present invention.

FIG. 4 is another flowchart of the nonlinear compensating method of the embodiments of the present invention. As shown in FIG. 4, the nonlinear compensating method includes:

step 401: acquiring a symbol information sequence of the pulse signals inputted by a transmitting side;

step 402: calculating a weighted value of the interactions of pulses of items on one or more moments relative to the current moment by using a pre-obtained weighted coefficient to which each item corresponds, so as to obtain the perturbation quantity produced on a transmission link with a certain length;

step 403: quantifying weighting coefficients;

step 404: combining the items of the perturbation quantity based on the weighting coefficients, and transferring complex addition into a combination of addition and multiplication of the symbols in a finite symbol set; and step 405: calculating a difference between the symbol information sequence and the processed perturbation quantity to obtain a compensated symbol information sequence, so as to cause the transmitting side to transmit signals according to the compensated symbol information sequence.

In an embodiment, when the inputted signals are dual polarization signals, the formula below may be used in combining the items of the perturbation quantity based on the weighting coefficients in step 404:

$$\Delta_k^H = \sum_p R_p \left\{ \sum_{\substack{mn \neq 0 \\ R_p}} [A_{m+k}^H A_{n+k}^H (A_{m+n+k}^H)^* + A_{m+k}^H A_{n+k}^V (A_{m+n+k}^V)^*] - \sum_{\substack{mn \neq 0 \\ -R_p}} [A_{m+k}^H A_{n+k}^H (A_{m+n+k}^H)^* + A_{m+k}^H A_{n+k}^V (A_{m+n+k}^V)^*] \right\} + j \sum_q I_q \left\{ \sum_{\substack{mn \neq 0 \\ I_q}} [A_{m+k}^H A_{n+k}^H (A_{m+n+k}^H)^* + A_{m+k}^H A_{n+k}^V (A_{m+n+k}^V)^*] + \sum_{\substack{mn \neq 0 \\ -I_q}} [A_{m+k}^H A_{n+k}^H (A_{m+n+k}^H)^* + A_{m+k}^H A_{n+k}^V (A_{m+n+k}^V)^*] \right\} + j \sum_s D_s \sum_{D_s} [A_{m+k}^H A_k^V (A_{m+k}^V)^* + A_{-m+k}^H A_k^V (A_{-m+k}^V)^*]$$

$$\Delta_k^V = \sum_p R_p \left\{ \sum_{\substack{mn \neq 0 \\ R_p}} [A_{m+k}^V A_{n+k}^V (A_{m+n+k}^V)^* + A_{m+k}^V A_{n+k}^H (A_{m+n+k}^H)^*] - \sum_{\substack{mn \neq 0 \\ -R_p}} [A_{m+k}^V A_{n+k}^V (A_{m+n+k}^V)^* + A_{m+k}^V A_{n+k}^H (A_{m+n+k}^H)^*] \right\} + j \sum_q I_q \left\{ \sum_{\substack{mn \neq 0 \\ I_q}} [A_{m+k}^V A_{n+k}^V (A_{m+n+k}^V)^* + A_{m+k}^V A_{n+k}^H (A_{m+n+k}^H)^*] + \right.$$

-continued $$\sum_{\substack{mn\neq 0 \\ -I_q}} [A^V_{m+k} A^V_{n+k} (A^V_{m+n+k})^* + A^V_{m+k} A^H_{n+k} (A^H_{m+n+k})^*] \Bigg\} +$$

$$j \sum_s D_s \sum_{D_s} [A^V_{m+k} A^H_k (A^H_{m+k})^* + A^V_{-m+k} A^H_k (A^H_{-m+k})^*]$$

where, $\Delta_k^H$ and $\Delta_k^V$ respectively denote a sum of the weighting values of several items on the k-th moment at horizontal polarization state and vertical polarization state, $C(m, n, z=L)$ denotes the weighting coefficient of each item at a transmission link L, with m and n being integers, $R_p$ and $I_q$ are respectively representative of the real part and the imaginary part of the quantified coefficient $C(mn\neq 0, z=L)$, and $D_s$ is representative of the imaginary part of the quantified coefficient $C(m, 0, z=L)$, p, q and s are respectively representative of different quantitative levels, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and vertical polarization state.

In another embodiment, when the inputted signals are single polarization signals, the formula below may be used in combining the items of the perturbation quantity based on the weighting coefficients in step 404

$$\Delta_k = \sum_p R_p \Bigg\{ \sum_{\substack{mn\neq 0 \\ R_p}} [A_{m+k} A_{n+k} (A_{m+n+k})^*] - \sum_{\substack{mn\neq 0 \\ -R_p}} [A_{m+k} A_{n+k} (A_{m+n+k})^*] \Bigg\} +$$

$$j \sum_q I_q \Bigg\{ \sum_{\substack{mn\neq 0 \\ I_q}} [A_{m+k} A_{n+k} (A_{m+n+k})^*] + \sum_{\substack{mn\neq 0 \\ -I_q}} [A_{m+k} A_{n+k} (A_{m+n+k})^*] \Bigg\}$$

where, $\Delta_k$ denotes a sum of the weighting values of several items on the k-th moment, $C(m, n, z=L)$ denotes the weighting coefficient of each item at a transmission link L, $R_p$ and $I_q$ are respectively representative of the real part and the imaginary part of the quantified coefficient $C(mn\neq 0, z=L)$, with m and n being integers, p and q are respectively representative of different quantitative levels, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

In this embodiment, after step 404, the obtained perturbation quantity may be rotated by a predefined phase, and the perturbation quantity may be adjusted by a predefined amplitude coefficient, thereby further improving the performance of the system efficiently.

Figure 5:
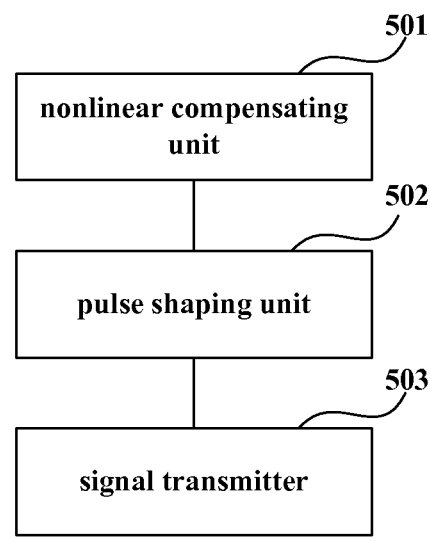
FIG. 5 is a schematic diagram of the construction of the transmitter of the embodiments of the present invention.

The embodiments of the present invention further provide a transmitter. FIG. 5 is a schematic diagram of the construction of the transmitter of the embodiments of the present invention. As shown in FIG. 5, the transmitter includes: a nonlinear compensating unit 501, a pulse shaping unit 502 and a signal transmitter 503.

Wherein, the nonlinear compensating unit 501 may compensate for a symbol information sequence of an inputted pulse, and may use the nonlinear compensating apparatus of the above embodiments, which shall not be described any further.

The pulse shaping unit 502 is used for performing pulses shaping based on the compensated symbol information sequence obtained by the nonlinear compensating unit 501, to obtain the waveform of each pulse.

And the signal transmitter 503 is used for receiving the waveform of each pulse transmitted by the pulse shaping unit 502, then modulating and transmitting the waveforms.

In this embodiment, the nonlinear compensating apparatus is applied in the transmitter. The transmitter may be applied in any optical communication systems in which a system with electric field dispersion pre-compensation is included. Therefore, the transmitter may further include a dispersion compensating unit (not shown), and in the system including dispersion pre-compensation, an intra-channel nonlinearity pre-compensator may be placed before the dispersion compensating unit. The weighted coefficients to which the weighted values of the interactions of the pulses at different moments correspond may still be calculated according to the above embodiments, only if a dispersion compensating module is taken into consideration in the configuration of the dispersion.

It can be seen from the above embodiments that the nonlinear compensating apparatus may compensate for the symbol information of the pulse signals inputted by a transmitting side, and if the apparatus is applied in a transmitter, the transmitter can shape and modulate the pulses by using the compensated symbol information, and then transmit the signals; and after these signals are subjected to the nonlinear effect of optical fiber transmission, ideal undamaged signals may be obtained at the receiver.

And by combining pulse interactive items according to properties of weighting coefficients, the complex addition may be transferred into a combination of addition and multiplication of the symbols in a finite symbol set, thereby further lowering the complexity of calculation and lowering the requirements on the hardware.

The above apparatus and method of the present invention may be implemented by hardware, or may be implemented by hardware in combination with software. The present invention relates to such a computer-readable program that when it is executed by a logic component, it enables the logic component to implement the above apparatus or its compositions, or enables the logic component to implement all the method or steps described above. The present further relates to a storage medium in which the above program is stored, such as a hard disk, a floppy disk, a compacted disk, a DVD, or a flash memory, etc.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

For the implementation of the present invention containing the above embodiments, following supplements are further disclosed.

(Supplement 1). A nonlinear compensating apparatus, includes:

an information sequence acquiring unit, configured to acquire a symbol information sequence of the pulse signal inputted by a transmitting side;

a perturbation quantity acquiring unit, configured to calculate by pre-obtained weighting coefficients to which each item corresponds, the weighted sum of interaction items of pulses on one or more moments relative to the current moment, to obtain the perturbation quantity produced on a transmission link with a certain length;

a perturbation quantity processing unit, configured to combine the items of the perturbation quantity based on the weighting coefficients, so as to transform complex addition into a combination of addition and multiplication of symbols in a finite symbol set; and an information compensating unit, configured to calculate a difference between the symbol information sequence and the processed perturbation quantity to obtain a compensated symbol information sequence, so as to cause the transmitting side to transmit signals according to the compensated symbol information sequence.

(Supplement 2). The nonlinear compensating apparatus according to supplement 1, wherein the perturbation quantity processing unit is used for combining the items to which the equal or approximately equal weighting coefficients correspond, or for combining the items to which the real parts of the weighting coefficients correspond, or for combining the items to which the imaginary parts of the weighting coefficients correspond.

(Supplement 3). The nonlinear compensating apparatus according to supplement 2, wherein the inputted pulse signal is a dual-polarization signal, and the perturbation quantity processing unit uses the following formula in combining the items of the perturbation quantity:

$$\Delta_k^H = \sum_{a \neq 0} \text{Re}[C(mn=a, z=L)] \sum_{\substack{mn \neq 0 \\ mn=a}} [A_{m+k}^H A_{n+k}^H (A_{m+n+k}^H)^* + A_{m+k}^H A_{n+k}^V (A_{m+n+k}^V)^*] +$$

$$j \sum_{a \neq 0} \text{Im}[C(mn=a, z=L)] \sum_{\substack{mn \neq 0 \\ mn=a}} [A_{m+k}^H A_{n+k}^H (A_{m+n+k}^H)^* + A_{m+k}^H A_{n+k}^V (A_{m+n+k}^V)^*] +$$

$$j \sum_{m \neq 0} [A_{m+k}^H A_k^V (A_{m+k}^V)^* + A_{-m+k}^H A_k^V (A_{-m+k}^V)^*] \text{Im}(C(m, 0, z=L))$$

$$\Delta_k^V = \sum_{a \neq 0} \text{Re}[C(mn=a, z=L)] \sum_{\substack{mn \neq 0 \\ mn=a}} [A_{m+k}^V A_{n+k}^V (A_{m+n+k}^V)^* + A_{m+k}^V A_{n+k}^H (A_{m+n+k}^H)^*] +$$

$$j \sum_{a \neq 0} \text{Im}[C(mn=a, z=L)] \sum_{\substack{mn \neq 0 \\ mn=a}} [A_{m+k}^V A_{n+k}^V (A_{m+n+k}^V)^* + A_{m+k}^V A_{n+k}^H (A_{m+n+k}^H)^*] +$$

$$j \sum_{m \neq 0} [A_{m+k}^V A_k^H (A_{m+k}^H)^* + A_{-m+k}^V A_k^H (A_{-m+k}^H)^*] \text{Im}(C(m, 0, z=L))$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

(Supplement 4). The nonlinear compensating apparatus according to supplement 2, wherein the inputted pulse signal is a dual-polarization signal, and the perturbation quantity processing unit uses the following formula in combining the items of the perturbation quantity:

$$\Delta_k^H = \sum_{a>0} \text{Re}[C(mn=a, z=L)]\left\{\sum_{\substack{mn \neq 0 \\ mn=a}} [A_{m+k}^H A_{n+k}^H (A_{m+n+k}^H)^* + A_{m+k}^H A_{n+k}^V (A_{m+n+k}^V)^*] - \sum_{\substack{mn \neq 0 \\ mn=-a}} [A_{m+k}^H A_{n+k}^H (A_{m+n+k}^H)^* + A_{m+k}^H A_{n+k}^V (A_{m+n+k}^V)^*]\right\} +$$

$$j \sum_{a>0} \text{Im}[C(mn=a, z=L)]\left\{\sum_{\substack{mn \neq 0 \\ mn=a}} [A_{m+k}^H A_{n+k}^H (A_{m+n+k}^H)^* + A_{m+k}^H A_{n+k}^V (A_{m+n+k}^V)^*] + \sum_{\substack{mn \neq 0 \\ mn=-a}} [A_{m+k}^H A_{n+k}^H (A_{m+n+k}^H)^* + A_{m+k}^H A_{n+k}^V (A_{m+n+k}^V)^*]\right\} +$$

$$j \sum_{m>0} [A_{m+k}^H A_k^V (A_{m+k}^V)^* + A_{-m+k}^H A_k^V (A_{-m+k}^V)^*] \text{Im}[C(m, 0, z=L)]$$

$$\Delta_k^V = \sum_{a>0} \text{Re}[C(mn=a, z=L)]\left\{\sum_{\substack{mn \neq 0 \\ mn=a}} [A_{m+k}^V A_{n+k}^V (A_{m+n+k}^V)^* + A_{m+k}^V A_{n+k}^H (A_{m+n+k}^H)^*] - \sum_{\substack{mn \neq 0 \\ mn=-a}} [A_{m+k}^V A_{n+k}^V (A_{m+n+k}^V)^* + A_{m+k}^V A_{n+k}^H (A_{m+n+k}^H)^*]\right\} +$$

$$j \sum_{a>0} \text{Im}[C(mn=a, z=L)]\left\{\sum_{\substack{mn \neq 0 \\ mn=a}} [A_{m+k}^V A_{n+k}^V (A_{m+n+k}^V)^* + A_{m+k}^V A_{n+k}^H (A_{m+n+k}^H)^*] + \sum_{\substack{mn \neq 0 \\ mn=-a}} [A_{m+k}^V A_{n+k}^V (A_{m+n+k}^V)^* + A_{m+k}^V A_{n+k}^H (A_{m+n+k}^H)^*]\right\} +$$

$$j \sum_{m>0} [A_{m+k}^V A_k^H (A_{m+k}^H)^* + A_{-m+k}^V A_k^H (A_{-m+k}^H)^*] \text{Im}[C(m, 0, z=L)]$$

where, $\Delta_k^H$ and $\Delta_k^V$ respectively denote a sum of the weighting values of several items on the k-th moment at horizontal polarization state and vertical polarization state, C(m, n, z=L)

denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

(Supplement 5). The nonlinear compensating apparatus according to supplement 2, wherein the inputted pulse signal is a single-polarization signal, and the perturbation quantity processing unit uses the following formula in combining the items of the perturbation quantity:

$$\Delta_k = \sum_{a \neq 0} \text{Re}[C(mn = a, z = L)] \sum_{\substack{mn \neq 0 \\ mn = a}} [A_{m+k} A_{n+k} (A_{m+n+k})^*] + j \sum_{a \neq 0} \text{Im}[C(mn = a, z = L)] \sum_{\substack{mn \neq 0 \\ mn = a}} [A_{m+k} A_{n+k} (A_{m+n+k})^*]$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

(Supplement 6). The nonlinear compensating apparatus according to supplement 2, wherein the inputted pulse signal is a single-polarization signal, and the perturbation quantity processing unit uses the following formula in combining the items of the perturbation quantity:

$$\Delta_k = \sum_{a > 0} \text{Re}[C(mn = a, z = L)] \left\{ \sum_{\substack{mn \neq 0 \\ mn = a}} [A_{m+k} A_{n+k} (A_{m+n+k})^*] - \sum_{\substack{mn \neq 0 \\ mn = -a}} [A_{m+k} A_{n+k} (A_{m+n+k})^*] \right\} + j \sum_{a > 0} \text{Im}[C(mn = a, z = L)] \left\{ \sum_{\substack{mn \neq 0 \\ mn = a}} [A_{m+k} A_{n+k} (A_{m+n+k})^*] + \sum_{\substack{mn \neq 0 \\ mn = -a}} [A_{m+k} A_{n+k} (A_{m+n+k})^*] \right\}$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

(Supplement 7). The nonlinear compensating apparatus according to supplement 2, wherein before combining the items to which the weighting coefficients correspond, the perturbation quantity processing unit quantifies the weighting coefficients.

(Supplement 8). The nonlinear compensating apparatus according to supplement 7, wherein the inputted pulse signal is a dual-polarization signal, and the perturbation quantity processing unit uses the following formula in combining the items of the perturbation quantity:

$$\Delta_k^H = \sum_p R_p \left\{ \sum_{\substack{mn \neq 0 \\ R_p}} [A_{m+k}^H A_{n+k}^H (A_{m+n+k}^H)^* + A_{m+k}^H A_{n+k}^V (A_{m+n+k}^V)^*] - \sum_{\substack{mn \neq 0 \\ -R_p}} [A_{m+k}^H A_{n+k}^H (A_{m+n+k}^H)^* + A_{m+k}^H A_{n+k}^V (A_{m+n+k}^V)^*] \right\} + j \sum_q I_q \left\{ \sum_{\substack{mn \neq 0 \\ I_q}} [A_{m+k}^H A_{n+k}^H (A_{m+n+k}^H)^* + A_{m+k}^H A_{n+k}^V (A_{m+n+k}^V)^*] + \sum_{\substack{mn \neq 0 \\ -I_q}} [A_{m+k}^H A_{n+k}^H (A_{m+n+k}^H)^* + A_{m+k}^H A_{n+k}^V (A_{m+n+k}^V)^*] \right\} + j \sum_s D_s \sum_{D_s} [A_{m+k}^H A_k^V (A_{m+k}^V)^* + A_{-m+k}^H A_k^V (A_{-m+k}^V)^*]$$

$$\Delta_k^V = \sum_p R_p \left\{ \sum_{\substack{mn \neq 0 \\ R_p}} [A_{m+k}^V A_{n+k}^V (A_{m+n+k}^V)^* + A_{m+k}^V A_{n+k}^H (A_{m+n+k}^H)^*] - \sum_{\substack{mn \neq 0 \\ -R_p}} [A_{m+k}^V A_{n+k}^V (A_{m+n+k}^V)^* + A_{m+k}^V A_{n+k}^H (A_{m+n+k}^H)^*] \right\} + j \sum_q I_q \left\{ \sum_{\substack{mn \neq 0 \\ I_q}} [A_{m+k}^V A_{n+k}^V (A_{m+n+k}^V)^* + A_{m+k}^V A_{n+k}^H (A_{m+n+k}^H)^*] + \sum_{\substack{mn \neq 0 \\ -I_q}} [A_{m+k}^V A_{n+k}^V (A_{m+n+k}^V)^* + A_{m+k}^V A_{n+k}^H (A_{m+n+k}^H)^*] \right\} + j \sum_s D_s \sum_{D_s} [A_{m+k}^V A_k^H (A_{m+k}^H)^* + A_{-m+k}^V A_k^H (A_{-m+k}^H)^*]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, $R_p$ and $I_q$ are respectively representative of the real part and the imaginary part of the quantified coefficient C(mn≠0, z=L), and $D_s$ is representative of the imaginary part of the quantified coefficient C(m, 0, z=L), p, q and s are respectively representative of different quantitative levels, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and vertical polarization state.

(Supplement 9). The nonlinear compensating apparatus according to supplement 7, wherein the inputted pulse signal is a single-polarization signal, and the perturbation quantity processing unit uses the following formula in combining the items of the perturbation quantity:

$$\Delta_k = \sum_p R_p \left\{ \sum_{\substack{mn \neq 0 \\ R_p}} [A_{m+k} A_{n+k} (A_{m+n+k})^*] - \sum_{\substack{mn \neq 0 \\ -R_p}} [A_{m+k} A_{n+k} (A_{m+n+k})^*] \right\} +$$

$$j \sum_q I_q \left\{ \sum_{\substack{mn \neq 0 \\ I_q}} [A_{m+k} A_{n+k} (A_{m+n+k})^*] + \sum_{\substack{mn \neq 0 \\ -I_q}} [A_{m+k} A_{n+k} (A_{m+n+k})^*] \right\}$$

where, $\Delta_k$ denotes a sum of the weighting values of several items on the k-th moment, C(m, n, z=L) denotes the weighting coefficient of each item at a transmission link L, $R_p$ and $I_q$ are respectively representative of the real part and the imaginary part of the quantified coefficient C(mn≠0, z=L), with m and n being integers, p and q are respectively representative of different quantitative levels, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

(Supplement 10). The nonlinear compensating apparatus according to supplement 1 or 2, wherein the perturbation quantity processing unit is further used for rotating the obtained perturbation quantity by a predefined phase, and adjusting the perturbation quantity by a predefined amplitude coefficient.

(Supplement 11). A nonlinear compensating method, includes:

acquiring a symbol information sequence of the pulse signal inputted by a transmitting side;

calculating, by pre-obtained weighting coefficients to which each item corresponds, the weighted sum of interaction items of pulses on one or more moments relative to the current moment, to obtain the perturbation quantity produced on a transmission link with a certain length;

combining the items of the perturbation quantity based on the weighting coefficients, so as to transform complex addition into a combination of addition and multiplication of symbols in a finite symbol set; and calculating a difference between the symbol information sequence and the processed perturbation quantity to obtain a compensated symbol information sequence, so as to cause the transmitting side to transmit signals according to the compensated symbol information sequence.

(Supplement 12). The nonlinear compensating method according to supplement 11, wherein the combining the items of the perturbation quantity based on the weighting coefficients includes:

combining the items to which the equal or approximately equal weighting coefficients correspond, or combining the items to which the real parts of the weighting coefficients correspond, or combining the items to which the imaginary parts of the weighting coefficients correspond.

(Supplement 13). The nonlinear compensating method according to supplement 12, wherein when the inputted signals are dual polarization signals, the formula below may be used in combining the items of the perturbation quantity based on the weighting coefficients:

$$\Delta_k^H = \sum_{a \neq 0} \text{Re}[C(mn = a, z = L)] \sum_{\substack{mn \neq 0 \\ mn = a}} [A_{m+k}^H A_{n+k}^H (A_{m+n+k}^H)^* +$$

$$A_{m+k}^H A_{n+k}^V (A_{m+n+k}^V)^*] +$$

$$j \sum_{a \neq 0} \text{Im}[C(mn = a, z = L)] \sum_{\substack{mn \neq 0 \\ mn = a}} [A_{m+k}^H A_{n+k}^H (A_{m+n+k}^H)^* +$$

$$A_{m+k}^H A_{n+k}^V (A_{m+n+k}^V)^*] +$$

$$j \sum_{m \neq 0} [A_{m+k}^H A_k^V (A_{m+k}^V)^* + A_{-m+k}^H A_k^V (A_{-m+k}^V)^*] \text{Im}[C(m, 0, z = L)]$$

$$\Delta_k^V = \sum_{a \neq 0} \text{Re}[C(mn = a, z = L)] \sum_{\substack{mn \neq 0 \\ mn = a}} [A_{m+k}^V A_{n+k}^V (A_{m+n+k}^V)^* +$$

$$A_{m+k}^V A_{n+k}^H (A_{m+n+k}^H)^*] +$$

$$j \sum_{a \neq 0} \text{Im}[C(mn = a, z = L)] \sum_{\substack{mn \neq 0 \\ mn = a}} [A_{m+k}^V A_{n+k}^V (A_{m+n+k}^V)^* +$$

$$A_{m+k}^V A_{n+k}^H (A_{m+n+k}^H)^*] +$$

$$j \sum_{m \neq 0} [A_{m+k}^V A_k^H (A_{m+k}^H)^* + A_{-m+k}^V A_k^H (A_{-m+k}^H)^*] \text{Im}[C(m, 0, z = L)]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

(Supplement 14). The nonlinear compensating method according to supplement 12, wherein when the inputted signals are dual polarization signals, the formula below may be used in combining the items of the perturbation quantity based on the weighting coefficients:

$$\Delta_k^H = \sum_{a > 0} \text{Re}[C(mn = a, z =$$

$$L)] \left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] - \right.$$

-continued $$\sum_{\substack{mn\neq 0\\mn=-a}}[A^H_{m+k}A^H_{n+k}(A^H_{m+n+k})^* + A^H_{m+k}A^V_{n+k}(A^V_{m+n+k})^*]\Bigg\} +$$

$$j\sum_{a>0}\mathrm{Im}[C(mn=a,z=L)]\Bigg\{\sum_{\substack{mn\neq 0\\mn=a}}[A^H_{m+k}A^H_{n+k}(A^H_{m+n+k})^* +$$

$$A^H_{m+k}A^V_{n+k}(A^V_{m+n+k})^*] +$$

$$\sum_{\substack{mn\neq 0\\mn=-a}}[A^H_{m+k}A^H_{n+k}(A^H_{m+n+k})^* + A^H_{m+k}A^V_{n+k}(A^V_{m+n+k})^*]\Bigg\} +$$

$$j\sum_{m>0}[A^H_{m+k}A^V_k(A^V_{m+k})^* + A^H_{-m+k}A^V_k(A^V_{-m+k})^*]\mathrm{Im}[C(m,0,z=L)]$$

$$\Delta^V_k = \sum_{a>0}\mathrm{Re}[C(mn=a,z=$$

$$L)]\Bigg\{\sum_{\substack{mn\neq 0\\mn=a}}[A^V_{m+k}A^V_{n+k}(A^V_{m+n+k})^* + A^V_{m+k}A^H_{n+k}(A^H_{m+n+k})^*] -$$

$$\sum_{\substack{mn\neq 0\\mn=-a}}[A^V_{m+k}A^V_{n+k}(A^V_{m+n+k})^* + A^V_{m+k}A^H_{n+k}(A^H_{m+n+k})^*]\Bigg\} +$$

$$j\sum_{a>0}\mathrm{Im}[C(mn=a,z=L)]\Bigg\{\sum_{\substack{mn\neq 0\\mn=a}}[A^V_{m+k}A^V_{n+k}(A^V_{m+n+k})^* +$$

$$A^V_{m+k}A^H_{n+k}(A^H_{m+n+k})^*] +$$

$$\sum_{\substack{mn\neq 0\\mn=-a}}[A^V_{m+k}A^V_{n+k}(A^V_{m+n+k})^* + A^V_{m+k}A^H_{n+k}(A^H_{m+n+k})^*]\Bigg\} +$$

$$j\sum_{m>0}[A^V_{m+k}A^H_k(A^H_{m+k})^* + A^V_{-m+k}A^H_k(A^H_{-m+k})^*]\mathrm{Im}[C(m,0,z=L)]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

(Supplement 15). The nonlinear compensating method according to supplement 12, wherein when the inputted signals are single polarization signals, the formula below may be used in combining the items of the perturbation quantity based on the weighting coefficients:

$$\Delta_k = \sum_{a\neq 0}\mathrm{Re}[C(mn=a,z=L)]\sum_{\substack{mn\neq 0\\mn=a}}[A_{m+k}A_{n+k}(A_{m+n+k})^*] +$$

$$j\sum_{a\neq 0}\mathrm{Im}[C(mn=a,z=L)]\sum_{\substack{mn\neq 0\\mn=a}}[A_{m+k}A_{n+k}(A_{m+n+k})^*]$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

(Supplement 16). The nonlinear compensating method according to supplement 12, wherein when the inputted signals are single polarization signals, the formula below may be used in combining the items of the perturbation quantity based on the weighting coefficients:

$$\Delta_k = \sum_{a>0}\mathrm{Re}[C(mn=a,z=$$

$$L)]\Bigg\{\sum_{\substack{mn\neq 0\\mn=a}}[A_{m+k}A_{n+k}(A_{m+n+k})^*] - \sum_{\substack{mn\neq 0\\mn=-a}}[A_{m+k}A_{n+k}(A_{m+n+k})^*]\Bigg\} +$$

$$j\sum_{a>0}\mathrm{Im}[C(mn=a,z=L)]\Bigg\{\sum_{\substack{mn\neq 0\\mn=a}}[A_{m+k}A_{n+k}(A_{m+n+k})^*] +$$

$$\sum_{\substack{mn\neq 0\\mn=-a}}[A_{m+k}A_{n+k}(A_{m+n+k})^*]\Bigg\}$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

(Supplement 17). The nonlinear compensating method according to supplement 12, wherein before combining the items of the perturbation quantity based on the weighting coefficients, the method further includes: quantifying the weighting coefficients.

(Supplement 18). The nonlinear compensating method according to supplement 17, wherein when the inputted signals are dual polarization signals, the formula below may be used in combining the items of the perturbation quantity based on the weighting coefficients:

$$\Delta_k^H = \sum_p R_p \left\{ \sum_{\substack{mn \neq 0 \\ R_p}} [A_{m+k}^H A_{n+k}^H (A_{m+n+k}^H)^* + A_{m+k}^H A_{n+k}^V (A_{m+n+k}^V)^*] - \right.$$

$$\sum_{\substack{mn \neq 0 \\ -R_p}} [A_{m+k}^H A_{n+k}^H (A_{m+n+k}^H)^* + A_{m+k}^H A_{n+k}^V (A_{m+n+k}^V)^*] \right\} +$$

$$j \sum_q I_q \left\{ \sum_{\substack{mn \neq 0 \\ I_q}} [A_{m+k}^H A_{n+k}^H (A_{m+n+k}^H)^* + A_{m+k}^H A_{n+k}^V (A_{m+n+k}^V)^*] + \right.$$

$$\sum_{\substack{mn \neq 0 \\ -I_q}} [A_{m+k}^H A_{n+k}^H (A_{m+n+k}^H)^* + A_{m+k}^H A_{n+k}^V (A_{m+n+k}^V)^*] \right\} +$$

$$j \sum_s D_s \sum_{D_s} [A_{m+k}^H A_k^V (A_{m+k}^V)^* + A_{-m+k}^H A_k^V (A_{-m+k}^V)^*]$$

$$\Delta_k^V = \sum_p R_p \left\{ \sum_{\substack{mn \neq 0 \\ R_p}} [A_{m+k}^V A_{n+k}^V (A_{m+n+k}^V)^* + A_{m+k}^V A_{n+k}^H (A_{m+n+k}^H)^*] - \right.$$

$$\sum_{\substack{mn \neq 0 \\ -R_p}} [A_{m+k}^V A_{n+k}^V (A_{m+n+k}^V)^* + A_{m+k}^V A_{n+k}^H (A_{m+n+k}^H)^*] \right\} +$$

$$j \sum_q I_q \left\{ \sum_{\substack{mn \neq 0 \\ I_q}} [A_{m+k}^V A_{n+k}^V (A_{m+n+k}^V)^* + A_{m+k}^V A_{n+k}^H (A_{m+n+k}^H)^*] + \right.$$

$$\sum_{\substack{mn \neq 0 \\ -I_q}} [A_{m+k}^V A_{n+k}^V (A_{m+n+k}^V)^* + A_{m+k}^V A_{n+k}^H (A_{m+n+k}^H)^*] \right\} +$$

$$j \sum_s D_s \sum_{D_s} [A_{m+k}^V A_k^H (A_{m+k}^H)^* + A_{-m+k}^V A_k^H (A_{-m+k}^H)^*]$$

where, $\Delta_k^H$ and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, $R_p$ and $I_q$ are respectively representative of the real part and the imaginary part of the quantified coefficient C(mn≠0, z=L), and $D_s$ is representative of the imaginary part of the quantified coefficient C(m, 0, z=L), p, q and s are respectively representative of different quantitative levels, $A_{m+k}^H$ and $A_{m+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and vertical polarization state.

(Supplement 19). The nonlinear compensating method according to supplement 17, wherein when the inputted signals are single polarization signals, the formula below may be used in combining the items of the perturbation quantity based on the weighting coefficients:

$$\Delta_k = \sum_p R_p \left\{ \sum_{\substack{mn \neq 0 \\ R_p}} [A_{m+k} A_{n+k} (A_{m+n+k})^*] - \sum_{\substack{mn \neq 0 \\ -R_p}} [A_{m+k} A_{n+k} (A_{m+n+k})^*] \right\} +$$

$$j \sum_q I_q \left\{ \sum_{\substack{mn \neq 0 \\ I_q}} [A_{m+k} A_{n+k} (A_{m+n+k})^*] + \sum_{\substack{mn \neq 0 \\ -I_q}} [A_{m+k} A_{n+k} (A_{m+n+k})^*] \right\}$$

where, $\Delta_k$ denotes a sum of the weighting values of several items on the k-th moment, C(m, n, z=L) denotes the weighting coefficient of each item at a transmission link L, $R_p$ and $I_q$ are respectively representative of the real part and the imaginary part of the quantified coefficient C(mn≠0, z=L), with m and n being integers, p and q are respectively representative of different quantitative levels, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

(Supplement 20). A transmitter, includes the nonlinear compensating apparatus as described in any one of supplements 1-10, and the transmitter further includes:

a pulse shaping unit, configured to pulses shape based on the compensated symbol information sequence obtained by the nonlinear compensating apparatus, to obtain the waveform of each pulse; and a signal transmitter, configured to receive the waveform of each pulse transmitted by the pulse shaping unit, then modulate and transmit the waveforms.

What is claimed is:

1. A nonlinear compensating apparatus, comprising:
    an information sequence acquiring unit, configured to acquire a symbol information sequence of a pulse signal inputted by a transmitting side;
    a perturbation quantity acquiring unit, configured to calculate, by pre-obtained weighting coefficients to which each item corresponds, the weighted sum of interaction items of pulses on one or more moments relative to the current moment, to obtain a perturbation quantity produced on a transmission link with a certain length;
    a perturbation quantity processing unit, configured to combine the items of the perturbation quantity based on the weighting coefficients, so as to transform complex addition into a combination of addition and multiplication of symbols in a finite symbol set; and
    an information compensating unit, configured to calculate a difference between the symbol information sequence and the processed perturbation quantity to obtain a compensated symbol information sequence, so as to cause the transmitting side to transmit signals according to the compensated symbol information sequence;
    wherein the perturbation quantity processing unit is used for combining the items to which the equal or approximately equal weighting coefficients correspond, or for combining the items to which the real parts of the weighting coefficients correspond, or for combining the items to which the imaginary parts of the weighting coefficients correspond.

2. The nonlinear compensating apparatus according to claim 1, wherein the inputted pulse signal is a dual-polarization signal, and the perturbation quantity processing unit uses the following formula in combining the items of the perturbation quantity:

$$\Delta_k^H = \sum_{a \neq 0} \text{Re}[C(mn = a, z = L)] \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] +$$

$$j \sum_{a \neq 0} \text{Im}[C(mn = a, z = L)] \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] +$$

$$j \sum_{m \neq 0} [A_{m+k}^H A_k^V (A_{m+k}^V)^* + A_{-m+k}^H A_k^V (A_{-m+k}^V)^*] \text{Im}[C(m, 0, z = L)]$$

$$\Delta_k^V = \sum_{a \neq 0} \text{Re}[C(mn = a, z = L)] \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] +$$

$$j \sum_{a \neq 0} \text{Im}[C(mn = a, z = L)] \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] +$$

$$j \sum_{m \neq 0} [A_{m+k}^V A_k^H (A_{m+k}^H)^* + A_{-m+k}^V A_k^H (A_{-m+k}^H)^*] \text{Im}[C(m, 0, z = L)]$$

or, the perturbation quantity processing unit uses the following formula in combining the items of the perturbation quantity:

$$\Delta_k^H = \sum_{a > 0} \text{Re}[C(mn = a, z =$$

$$L)] \left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] - \right.$$

$$\left. \sum_{\substack{mn \neq 0 \\ mn = -a}} [A_{m+k}^H A_{n+k}^H (A_{m+n+k}^H)^* + A_{m+k}^H A_{n+k}^V (A_{m+n+k}^V)^*] \right\} +$$

$$j \sum_{a > 0} \text{Im}[C(mn = a, z = L)] \left\{ \sum_{\substack{mn \neq 0 \\ mn = a}} [A_{m+k}^H A_{n+k}^H (A_{m+n+k}^H)^* + A_{m+k}^H A_{n+k}^V (A_{m+n+k}^V)^*] + \right.$$

$$\left. \sum_{\substack{mn \neq 0 \\ mn = -a}} [A_{m+k}^H A_{n+k}^H (A_{m+n+k}^H)^* + A_{m+k}^H A_{n+k}^V (A_{m+n+k}^V)^*] \right\} +$$

$$j \sum_{m > 0} [A_{m+k}^H A_k^V (A_{m+k}^V)^* + A_{-m+k}^H A_k^V (A_{-m+k}^V)^*] \text{Im}[C(m, 0, z = L)]$$

$$\Delta_k^V = \sum_{a > 0} \text{Re}[C(mn = a, z =$$

-continued $$L)] \left\{ \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] - \right.$$

$$\left. \sum_{\substack{mn \neq 0 \\ mn = -a}} [A_{m+k}^V A_{n+k}^V (A_{m+n+k}^V)^* + A_{m+k}^V A_{n+k}^H (A_{m+n+k}^H)^*] \right\} +$$

$$j \sum_{a > 0} \text{Im}[C(mn = a, z = L)] \left\{ \sum_{\substack{mn \neq 0 \\ mn = a}} [A_{m+k}^V A_{n+k}^V (A_{m+n+k}^V)^* + A_{m+k}^V A_{n+k}^H (A_{m+n+k}^H)^*] + \right.$$

$$\left. \sum_{\substack{mn \neq 0 \\ mn = -a}} [A_{m+k}^V A_{n+k}^V (A_{m+n+k}^V)^* + A_{m+k}^V A_{n+k}^H (A_{m+n+k}^H)^*] \right\} +$$

$$j \sum_{m > 0} [A_{m+k}^V A_k^H (A_{m+k}^H)^* + A_{-m+k}^V A_k^H (A_{-m+k}^H)^*] \text{Im}[C(m, 0, z = L)]$$

where, $\Delta_k^H$, and $\Delta_k^V$ respectively denote a sum of the weighting values of several items on the k-th moment at horizontal polarization state and vertical polarization state, C(m, n, z=L) denotes the weighting coefficient of each item at a transmission link L, with m and n being integers, and a=m×n and being not equal to 0, $A_{m+k}^H$ and $A_{m+k}^V$ respectively denote the symbol information of the pulses on the (m+k)-th moment at the horizontal polarization state and the vertical polarization state, $A_{n+k}^H$, and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and the vertical polarization state.

3. The nonlinear compensating apparatus according to claim 1, wherein the inputted pulse signal is a single-polarization signal, and the perturbation quantity processing unit uses the following formula in combining the items of the perturbation quantity:

$$\Delta_k = \sum_{a \neq 0} \text{Re}[C(mn = a, z = L)] \sum_{\substack{mn \neq 0 \\ mn = a}} [A_{m+k} A_{n+k} (A_{m+n+k})^*] +$$

$$j \sum_{a \neq 0} \text{Im}[C(mn = a, z = L)] \sum_{\substack{mn \neq 0 \\ mn = a}} [A_{m+k} A_{n+k} (A_{m+n+k})^*]$$

or, the perturbation quantity processing unit uses the following formula in combining the items of the perturbation quantity:

$$\Delta_k = \sum_{a > 0} \text{Re}[C(mn = a, z =$$

$$L)] \left\{ \sum_{\substack{mn \neq 0 \\ mn = a}} [A_{m+k} A_{n+k} (A_{m+n+k})^*] - \sum_{\substack{mn \neq 0 \\ mn = -a}} [A_{m+k} A_{n+k} (A_{m+n+k})^*] \right\} +$$

-continued $$j\sum_{a>0} \text{Im}[C(mn=a, z=L)]\left\{\sum_{\substack{mn\neq 0 \\ mn=a}} [A_{m+k}A_{n+k}(A_{m+n+k})^*] + \sum_{\substack{mn\neq 0 \\ mn=-a}} [A_{m+k}A_{n+k}(A_{m+n+k})^*]\right\}$$

where, $\Delta_k$ denotes a sum of the weighting values of several items on the k-th moment, C(m, n, z=L) denotes the weighting coefficient of each item at a transmission link L, with m and n being integers, and a=m×n and being not equal to 0, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

4. The nonlinear compensating apparatus according to claim 1, wherein before combining the items to which the weighting coefficients correspond, the perturbation quantity processing unit quantifies the weighting coefficients.

5. The nonlinear compensating apparatus according to claim 4, wherein the inputted pulse signal is a dual-polarization signal, and the perturbation quantity processing unit uses the following formula in combining the items of the perturbation quantity:

$$\Delta_k^H = \sum_p R_p \left\{\sum_{\substack{mn\neq 0 \\ R_p}} [A_{m+k}^H A_{n+k}^H (A_{m+n+k}^H)^* + A_{m+k}^H A_{n+k}^V (A_{m+n+k}^V)^*] - \sum_{\substack{mn\neq 0 \\ -R_p}} [A_{m+k}^H A_{n+k}^H (A_{m+n+k}^H)^* + A_{m+k}^H A_{n+k}^V (A_{m+n+k}^V)^*]\right\} +$$

$$j\sum_q I_q \left\{\sum_{\substack{mn\neq 0 \\ I_q}} [A_{m+k}^H A_{n+k}^H (A_{m+n+k}^H)^* + A_{m+k}^H A_{n+k}^V (A_{m+n+k}^V)^*] + \sum_{\substack{mn\neq 0 \\ -I_q}} [A_{m+k}^H A_{n+k}^H (A_{m+n+k}^H)^* + A_{m+k}^H A_{n+k}^V (A_{m+n+k}^V)^*]\right\} +$$

$$j\sum_s D_s \sum_{D_s} [A_{m+k}^H A_k^V (A_{m+k}^V)^* + A_{-m+k}^H A_k^V (A_{-m+k}^V)^*]$$

$$\Delta_k^V = \sum_p R_p \left\{\sum_{\substack{mn\neq 0 \\ R_p}} [A_{m+k}^V A_{n+k}^V (A_{m+n+k}^V)^* + A_{m+k}^V A_{n+k}^H (A_{m+n+k}^H)^*] - \sum_{\substack{mn\neq 0 \\ -R_p}} [A_{m+k}^V A_{n+k}^V (A_{m+n+k}^V)^* + A_{m+k}^V A_{n+k}^H (A_{m+n+k}^H)^*]\right\} +$$

$$j\sum_q I_q \left\{\sum_{\substack{mn\neq 0 \\ I_q}} [A_{m+k}^V A_{n+k}^V (A_{m+n+k}^V)^* + A_{m+k}^V A_{n+k}^H (A_{m+n+k}^H)^*] + \sum_{\substack{mn\neq 0 \\ -I_q}} [A_{m+k}^V A_{n+k}^V (A_{m+n+k}^V)^* + A_{m+k}^V A_{n+k}^H (A_{m+n+k}^H)^*]\right\} +$$

$$j\sum_s D_s \sum_{D_s} [A_{m+k}^V A_k^H (A_{m+k}^H)^* + A_{-m+k}^V A_k^H (A_{-m+k}^H)^*]$$

where, $\Delta_k^H$ and $\Delta v_k^V$ respectively denote a sum of the weighting values of several items on the k-th moment at horizontal polarization state and vertical polarization state, C(m, n, z=L) denotes the weighting coefficient of each item at a transmission link L, with m and n being integers, $R_p$ and $I_q$ are respectively representative of the real part and the imaginary part of the quantified coefficient C(mn≠0, z=L), and $D_s$ is representative of the imaginary part of the quantified coefficient C(m, 0, z=L), p, q and s are respectively representative of different quantitative levels, $A_{m+k}^H$ and $A_{n+k}^V$ respectively denote the symbol information of the pulses on the (m+k)-th moment at the horizontal polarization state and the vertical polarization state, $A_{n+k}^H$ and $A_{n+k}^V$ respectively denote the symbol information of the pulses on the (n+k)-th moment at the horizontal polarization state and the vertical polarization state, and $(A_{m+n+k}^H)^*$ and $(A_{m+n+k}^V)^*$ respectively denote the conjugation of the symbol information of the pulses on the (m+n+k)-th moment at the horizontal polarization state and vertical polarization state.

6. The nonlinear compensating apparatus according to claim 4, wherein the inputted pulse signal is a single-polarization signal, and the perturbation quantity processing unit uses the following formula in combining the items of the perturbation quantity:

$$\Delta_k = \sum_p R_p \left\{\sum_{\substack{mn\neq 0 \\ R_p}} [A_{m+k}A_{n+k}(A_{m+n+k})^*] - \sum_{\substack{mn\neq 0 \\ -R_p}} [A_{m+k}A_{n+k}(A_{m+n+k})^*]\right\} +$$

$$j\sum_q I_q \left\{\sum_{\substack{mn\neq 0 \\ I_q}} [A_{m+k}A_{n+k}(A_{m+n+k})^*] + \sum_{\substack{mn\neq 0 \\ -I_q}} [A_{m+k}A_{n+k}(A_{m+n+k})^*]\right\}$$

where, $\Delta_k$ denotes a sum of the weighting values of several items on the k-th moment, C(m, n, z=L) denotes the weighting coefficient of each item at a transmission link L, $R_p$ and $I_q$ are respectively representative of the real part and the imaginary part of the quantified coefficient C(mn≠0, z=L), with m and n being integers, p and q are respectively representative of different quantitative levels, $A_{m+k}$ and $A_{n+k}$ respectively denote the symbol information of the pulses on the (m+k)-th and (n+k)-th moments, and $(A_{m+n+k})^*$ denotes the conjugation of the symbol information of the pulses on the (m+n+k)-th moment.

7. The nonlinear compensating apparatus according to claim 1, wherein the perturbation quantity processing unit is further used for rotating the obtained perturbation quantity by a predefined phase, and adjusting the perturbation quantity by a predefined amplitude coefficient.

8. A nonlinear compensating method, comprising:
acquiring a symbol information sequence of a pulse signal inputted by a transmitting side;
calculating, by pre-obtained weighting coefficients to which each item corresponds, the weighted sum of interaction items of pulses on one or more moments relative to the current moment, to obtain a perturbation quantity produced on a transmission link with a certain length;
combining the items of the perturbation quantity based on the weighting coefficients, so as to transform complex addition into a combination of addition and multiplication of symbols in a finite symbol set; and
calculating a difference between the symbol information sequence and the processed perturbation quantity to obtain a compensated symbol information sequence, so as to cause the transmitting side to transmit signals according to the compensated symbol information sequence;
wherein combining the items of the perturbation quantity based on the weighting coefficients comprising: combining the items to which the equal or approximately equal weighting coefficients correspond, or for combining the items to which the real parts of the weighting coefficients correspond, or for combining the items to which the imaginary parts of the weighting coefficients correspond.

9. A transmitter, comprising the nonlinear compensating apparatus as claimed in claim 1, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

10. A transmitter, comprising the nonlinear compensating apparatus as claimed in claim 2, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

11. A transmitter, comprising the nonlinear compensating apparatus as claimed in claim 3, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

12. A transmitter, comprising the nonlinear compensating apparatus as claimed in claim 4, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

13. A transmitter, comprising the nonlinear compensating apparatus as claimed in claim 5, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

14. A transmitter, comprising the nonlinear compensating apparatus as claimed in claim 6, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

15. A transmitter, comprising the nonlinear compensating apparatus as claimed in claim 7, and the transmitter further comprising:
a pulse shaping unit, configured to pulses shape based on the compensated symbol information sequence obtained by the nonlinear compensating apparatus, to obtain the waveform of each pulse; and
a signal transmitter, configured to receive the waveform of each pulse transmitted by the pulse shaping unit, then modulate and transmit the waveforms.

* * * * *

UNITED STATES PATENT AND TRADEMARK OFFICE
CERTIFICATE OF CORRECTION

PATENT NO. : 9,143,240 B2
APPLICATION NO. : 13/771822
DATED : September 22, 2015
INVENTOR(S) : Liang Dou et al.

Page 1 of 1

It is certified that error appears in the above-identified patent and that said Letters Patent is hereby corrected as shown below:

Title Page, Second Column, item (56) OTHER PUBLICATIONS, Lines 1-2
Delete "Matbab & Wavelents," and insert --Matlab & Wavelets,--, therefor.

In the Claims

Claim 2, Column 34, Line 24

Delete " $\Delta_k^H$ ," and insert -- $\Delta_k^H$ --, therefor.

Claim 2, Column 34, Line 32

Delete " $A_{n+k}^H$ " and insert -- $A_{n+k}^H$ --, therefor.

Claim 5, Column 36, Line 13

Delete " $\Delta V_k^V$ " and insert -- $\Delta_k^V$ --, therefor.

Claim 5, Column 36, Line 19
Delete "C(mn≠$_0$, z=L)" and insert --C(mn≠0, z=L)--, therefor.

Claim 5, Column 36, Line 22

Delete " $A_{n+k}^V$ " and insert -- $A_{m+k}^V$ --, therefor.

Signed and Sealed this
Ninth Day of February, 2016

Michelle K. Lee
*Director of the United States Patent and Trademark Office*